United States Patent [19]
Ohashi

[11] Patent Number: 5,799,245
[45] Date of Patent: Aug. 25, 1998

[54] COOPERATIVE DIVERSITY ANTENNA SWITCHING ON TRANSMITTER AND RECEIVER SIDE

[75] Inventor: Masakazu Ohashi, Tenri, Japan

[73] Assignee: Sharp Kabushiki Kaisha, Osaka, Japan

[21] Appl. No.: 638,562

[22] Filed: Apr. 26, 1996

[30] Foreign Application Priority Data

Apr. 27, 1995 [JP] Japan .................. 7-104433

[51] Int. Cl.$^6$ .................. H04B 7/06; H04B 7/08; H04L 1/06
[52] U.S. Cl. .................. 455/69; 455/70; 455/101; 455/277.1
[58] Field of Search .................. 455/69, 70, 101, 455/103, 132, 133, 134, 135, 272, 277.1, 277.2, 278.1, 504, 506; 375/299, 347

[56] References Cited

U.S. PATENT DOCUMENTS

| | | | |
|---|---|---|---|
| 4,710,944 | 12/1987 | Nossen | 375/567 |
| 5,088,113 | 2/1992 | Wei | 375/267 |
| 5,095,535 | 3/1992 | Freeburg | 455/278.1 |
| 5,507,035 | 4/1996 | Bantz et al. | 455/101 |

FOREIGN PATENT DOCUMENTS

| | | |
|---|---|---|
| 0622 911 A3 | 11/1994 | European Pat. Off. . |
| 55077247 | 12/1978 | Japan . |
| 2200018 | 1/1989 | Japan . |
| 3-135233 | 6/1991 | Japan . |
| 4-282922 | 10/1992 | Japan . |
| 5-29992 | 2/1993 | Japan . |
| 5-259950 | 10/1993 | Japan . |
| 6-314993 | 11/1994 | Japan . |
| 7-22989 | 1/1995 | Japan . |
| 7-7462 | 1/1995 | Japan . |
| 7-135492 | 5/1995 | Japan . |
| 7-245577 | 9/1995 | Japan . |

OTHER PUBLICATIONS

Takeuchi et al: "Experimental studies on fading reduction by four–direction antenna pattern diversity reception with variable multithreshold switching strategy." *Electronica and Communications in Japan*, Part 1, Mar. 1990, vol. 73, No. 3., pp. 1–13.

*Primary Examiner*—Reinhard J. Eisenzopf
*Assistant Examiner*—Lester G Kincaid
*Attorney, Agent, or Firm*—Nixon & Vanderhye P.C.

[57] ABSTRACT

The pair of radio communication apparatuses of this invention on a transmitter side and a receiver side conduct data transmission and receiving through radio communication by a space diversity method where a plurality of antennas are switched therebetween, wherein the radio communication apparatus on the transmitter side includes a transmission circuit for conducting data transmission and a transmitting antenna switch circuit for selecting a transmitting antenna among a plurality of transmitting antennas for transmitting radio waves and connecting the selected transmitting antenna to the transmission circuit, and the radio communication apparatus on the receiver side includes a receiving circuit for conducting data receiving and a receiving antenna switch circuit for selecting a receiving antenna among a plurality of receiving antennas on the receiver side the radio waves and connecting the selected receiving antenna to the receiving circuit.

12 Claims, 14 Drawing Sheets

COOPERATIVE DIVERSITY ANTENNA SWITCHING ON TRANSMITTER AND RECEIVER SIDE

BACKGROUND OF THE INVENTION

1. Field of the Invention

The present invention relates to a radio communication apparatus which conducts radio date transmission by a space diversity method.

2. Description of the Related Art

Radio communication apparatuses which conduct data transmission through radio communication are used for various types of radio communication systems to realize communication between communication networks such as LANs (local area networks) and WANs (wide area networks), as well as between electronic notebooks, personal computers, work stations, office processors, large-scale computers, POSs (point of sales systems), ECRs (electronic cash registers), sequencers, and the like. In such radio communication apparatuses, a space diversity method is widely employed where a plurality of antennas disposed at locations spatially different from one another are switched among them depending on the radio wave conditions to reduce fading.

The space diversity method employed in conventional radio communication apparatuses only switches either receiving antennas on the receiver side (receiver space diversity) or transmitting antennas on the transmitter side (transmitter space diversity). In the receiver space diversity method, receiving antennas are switched based on the receiving conditions such as the level of received data and an occurrence of a receiving error detected on the receiver side, to ensure good receiving conditions. In the transmitter space diversity method, transmitting antennas are switched based on whether or not a response has been sent from the receiver side and the like.

However, in indoor radio communication systems such as a radio LAN, where the radio wave environment is especially complicate, the transmission route of radio waves obtained by switching antennas an only one of the receiver and transmitter sides is too restrictive to obtain the effect of the space diversity sufficiently.

The conventional radio communication apparatuses has another drawback, which is described with reference to FIG. 14. Assume that a parent station 21 radio-communicates with four sub-stations 22 to 25 and only the parent station 21 can switch its antennas, as shown in FIG. 14. In this case, once the parent station 21 switches the antennas in response to data transmission from the sub-station 22, for example, good receiving conditions can be maintained in subsequent communication between the parent station 21 and the sub-station 22 without the need for the parent station 21 to switch its antennas. Thus, the space diversity effectively works. However, when the parent station 21 receives data from any of the other sub-stations 23 to 25, it will have to switch the antennas with high probability to obtain good receiving conditions for new data. In the case where the sub-stations 22 to 25 transmit data to the parent station 21 one after another frequently, it becomes difficult for the parent station 21 to switch the antennas in obedience to such frequent data transmission from the different sub-stations. In such a case, the effect of the space diversity cannot be obtained sufficiently. This trouble will be overcome if the sub-stations 22 to 25 are also allowed to switch their antennas. Then, the necessity for the parent station 21 to switch its antennas for each of the sub-stations 22 to 25 will be reduced.

SUMMARY OF THE INVENTION

The pair of radio communication apparatuses of this invention on a transmitter side and a receiver side conduct data transmission and receiving through radio communication by a space diversity method where a plurality of antennas are switched therebetween, wherein the radio communication apparatus on the transmitter side includes a transmission circuit for conducting data transmission and a transmitting antenna switch circuit for selecting a transmitting antenna among a plurality of transmitting antennas for transmitting radio waves and connecting the selected transmitting antenna to the transmission circuit, and the radio communication apparatus on the receiver side includes a receiving circuit for conducting data receiving and a receiving antenna switch circuit for selecting a receiving antenna among a plurality of receiving antennas on the receiver side the radio waves and connecting the selected receiving antenna to the receiving circuit.

In one embodiment of the invention, the radio communication apparatus on the transmitter side further includes transmitting antenna switch means for executing an antenna switch processing with the transmitting antenna switch circuit in accordance with a predetermined transmitting antenna switch procedure, and the radio communication apparatus on the receiver side further includes receiving antenna switch means for executing an antenna switch processing with the receiving antenna switch circuit in accordance with an independent receiving antenna switch procedure which is not synchronous with the antenna switch processing executed by the transmitting antenna switch means.

In another embodiment of the invention, the radio communication apparatus on the transmitter side further includes transmitting antenna switch means for executing an antenna switch processing by controlling whether or not the transmitting antennas are switched by the transmitting antenna switch circuit and which transmitting antenna is selected in accordance with an antenna switch procedure designed so that, when both the transmitting antenna switch circuit and the receiving antenna switch circuit switch the transmitting antennas and the receiving antennas simultaneously or either one of the transmitting antenna switch circuit and the receiving antenna switch circuit switches the transmitting or receiving antennas and a switch count corresponding to the number of times of switching is equal to a product of the number of transmitting antennas and the number of receiving antennas, all combinations of the transmitting antennas and the receiving antennas realized by all of the switching are different from one another, and the radio communication apparatus on the receiver side further includes receiving antenna switch means for executing an antenna switch processing by controlling whether or not the receiving antennas are switched by the receiving antenna switch circuit and which receiving antenna is selected in accordance with the antenna switch processing.

In still another embodiment of the invention, each of the radio communication apparatuses on the transmitter side and the receiver side further includes switch count means for counting the number of times of switching conducted by both the transmitting antenna switch circuit and the receiving antenna switch circuit simultaneously or by one of the antenna switch circuits, the radio communication apparatus on the transmitter side further includes transmitting antenna switch means for executing an antenna switch processing by allowing the transmitting antenna switch circuit to switch the transmitting antennas in a predetermined order only when a remainder of the switch count counted by the switch count means on the transmitter side divided by a predetermined transmission switch interval value, and the radio communication apparatus on the receiver side further includes receiving antenna switch means for executing an antenna switch processing by allowing the receiving antenna switch circuit to switch the receiving antennas in a predetermined order only when a remainder of the switch count counted by the switch count means on the receiver side divided by a predetermined receiving switch interval value.

In still another embodiment of the invention, the radio communication apparatus on the transmitter side further includes re-transmission means for transmitting data repeatedly for a predetermined number of times, and the transmitting antenna switch means executes the antenna switch processing every time the data is transmitted, and the radio communication apparatus on the receiver side further includes received data synthesizing means for selecting or synthesizing effective received data from a plurality of received data every time data is received a plurality of number of times, and the receiving antenna switch means executes the antenna switch processing every time the data is received.

In still another embodiment of the invention, the radio communication apparatus on the transmitter side further includes re-transmission means for re-transmitting previously transmitted data when a response indicating detection of a receiving error is received from the radio communication apparatus on the receiver side or a response indicating success in receiving the data is not received, and the transmitting antenna switch means executes the antenna switch processing when the re-transmission means re-transmits the transmitted data, and the radio communication apparatus on the receiver side further includes receiving error detection means for detecting a receiving error of received data and response means for sending a response to the radio communication apparatus on the transmitter side through radio communication when the receiving error detection means detects a receiving error or when the date has been successfully received, and the receiving antenna switch means executes the antenna switch processing every time the receiving error detection means detects a receiving error.

In still another embodiment of the invention, the radio communication apparatus on the receiver side further includes re-transmission receiving detection means for detecting that received data is re-transmitted data, and the receiving antenna switch means executes the antenna switch processing when the re-transmission receiving detection means detects that the received data is re-transmitted data, and the radio communication apparatus on the transmitter side further includes re-transmission detection means for detecting that transmitted data has been successfully received by re-transmission, and the transmitting antenna switch means executes the antenna switch processing when the re-transmission detection means detects success in transmitting data by re-transmission.

In still another embodiment of the invention, the radio communication apparatus on the receiver side further includes receiving level detection means for detecting a receiving level of received data and response means for sending a response to the radio communication apparatus on the transmitter side through radio communication when the receiving level detection means detects a low receiving level, and the receiving antenna switch means executes the antenna switch processing when the receiving level detection means detects a low receiving level, and the transmitting antenna switch means of the radio communication apparatus on the transmitter side executes the antenna switch processing when a response indicating detection of a low receiving level from the radio communication apparatus on the receiver side is received.

In still another embodiment of the invention, the radio communication apparatus on the receiver side further includes source address memory means for storing an address of a transmitter of previously received data and antenna switch withholding means for instructing the receiving antenna switch means to withhold the execution of the antenna switch processing and instructing the response means to withhold the sending of the response to the transmitter side when an address of a transmitter of currently received data is different from the source address stored in the source address memory means.

Thus, according to the present invention, not only the receiving antennas of the radio communication apparatus on the receiver side are switched by the receiving antenna switch circuit, but also the transmitting antennas of the radio communication apparatus on the transmitter side are also switched by the transmitting antenna switch circuit. Accordingly, a variety of combinations of the transmitting and receiving antennas can be realized, compared with the conventional space diversity method where the antennas are switched on only one of the transmitter and receiver sides. This increases the possibility of better transmission/receiving in a complicate radio wave circumstance.

The radio communication apparatus of the present invention is provided with both the transmitting antenna switch circuit and the receiving antenna switch circuit to effect both transmission and receiving. Alternatively the radio communication apparatus on the transmitter side may be provided with only the transmitting antenna switch circuit, while the radio communication apparatus on the receiver side may be provided with only the receiving antenna switch circuit. In the radio communication apparatus capable of conducting both transmission and receiving, the transmitting antennas can also be used as the receiving antennas. The same antenna switch circuit may be used as the transmitting antenna switch circuit at the transmission of data and as the receiving antenna switch circuit at the receiving of data.

The transmitting antenna switch means on the transmitter side and the receiving antenna switch means on the receiver side can execute the antenna switch processing in accordance with predetermined transmitting antenna switch procedure and receiving antenna switch procedure, respectively, which are completely independent from each other. In this case, all the combinations of the transmitting and receiving antennas can be selected eventually after the two sides repeat the antenna switch processing independently even if the two sides cannot exchange information on antenna switching with each other, though some combination may appear more frequently then other combinations. Thus, a combination allowing for good data transmission can be obtained.

Alternatively, the transmitting antenna switch means on the transmitter side and the receiving antenna switch means on the receiver side can execute the antenna switch processing in accordance with a predetermined antenna switch procedure. Accordingly, all the combinations of the transmitting and receiving antennas can be selected without fail. In some cases, the antenna switch processing may not actually be executed on one of the transmitter and receiver sides in accordance with the antenna switch procedure. Also, the antenna switch procedure may include steps where no antenna switching is conducted on either the transmitter side or the receiver side at predetermined intervals.

The antenna switch procedure can be designed so that the transmitting and receiving antennas can actually be switched only when the calculation result of the remainder of the switch count divided by the switch interval value is identical to a predetermined value. With such an antenna switch procedure, all the combinations of the transmitting and receiving antennas can be selected without fail only by the calculation between the current value of the switch count and a predetermined value.

All transmitting data can be re-transmitted for a predetermined number of times, and the combination of the transmitting and receiving antennas can be changed every time the data is re-transmitted or every time the data is re-transmitted a plurality of times. Thus, by realizing all the combination of the transmitting and receiving antennas, the transmitting data can be received on the receiving side without fail.

All the combinations of the transmitting and receiving antennas can also be realized by changing the combination sequentially every time a receiving error is detected on the receiver side or every time a plurality of receiving errors are detected on the receiver side. Thus, a combination free from the occurrence of a receiving error can be selected without fail. When date is successfully received on the receiver side, re-transmission of the data is no more conducted. This improves the time utilizing efficiency of data transmission.

Individual re-transmission on the transmitting and receiving sides can be detected after the re-transmission has been conducted. Accordingly, even in the case where detection of a receiving error and re-transmission are automatically conducted, a combination of the transmitting and receiving antennas through which data can be transmitted without an error can be selected without fail.

All the combinations of the transmitting and receiving antennas can also be realized by changing the combination sequentially every time low level receiving is detected on the receiver side or every time low level receiving is detected on the receiver side a plurality of times. Thus, a combination capable of realizing high level receiving can be selected without fail.

In the case where a new transmitter interrupts once or the transmitter frequently changes one after another, causing lowered receiving level, the antenna switch processing and the response to the transmitter side are not executed on the receiver side. Thus, the combination of the transmitting and receiving antennas is not changed unnecessarily.

Thus, the invention described herein makes possible the advantage of providing a radio communication apparatus which employs a space diversity method where antennas are switched both on the receiver and transmitter sides to ensure good data transmission/receiving even in a complicate radio wave environment.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings as follows.

(EXAMPLE 1)

Figure 1:
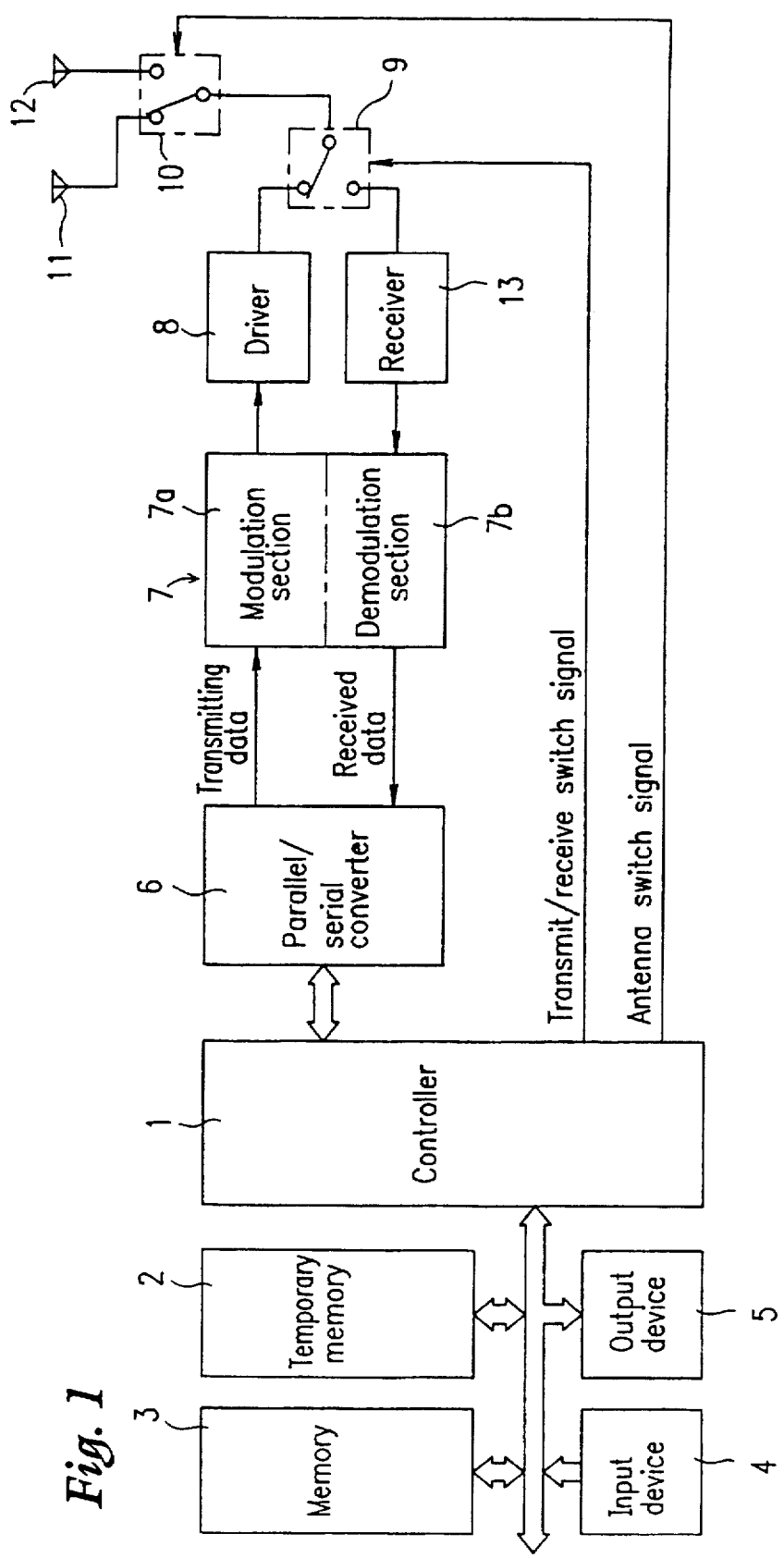
FIG. 1 is a block diagram showing the configuration of a terminal unit of Example 1 according to the present invention.

Referring to FIG. 1, the first example of the present invention will be described. FIG. 1 is a block diagram showing the configuration of a terminal unit of Example 1.

In this example, a terminal unit such as a work station and a shared printer provided with the radio transmission/receiving function used in a radio LAN and the like will be described.

Referring to FIG. 1, the terminal unit includes a controller 1 and a temporary memory 2 and a memory 3 which are connected with the controller 1 via buses. In this example, a CPU (control processing unit), a microcomputer, or the like is used as the controller 1. The temporary memory 2 is a volatile memory such as a RAM (random access memory), while the memory 3 is a non-volatile memory such as a ROM (read only memory) and a magnetic disk device. An input device 4 and an output device 5 are also connected with the controller 1 via buses. The input device 4 includes a keyboard or the like for operation input, an input interface with another device, and the like. The output device 5 includes a display, a printer, an output interface with another device, and the like.

The controller 1 is connected with a parallel/serial converter 6 to allow parallel data to be input into/output from the controller 1. The parallel/serial converter 6 converts transmitting data sent in parallel from the controller 1 into serial data and outputs the serial data, while it converts received data input in serial into parallel data and sends the parallel data to the controller 1. The transmitting data output from the parallel/serial converter 6 is sent to a transmit/receive switch circuit 9 via a modulation section 7a of a modulator/demodulator 7 and a driver 8. The modulation section 7a of the modulator/demodulator 7 is a circuit which modulates a transmitting carrier in accordance with transmitting data and outputs the resultant data as a transmitting signal. The driver B is a circuit which adjusts or converts the level of the transmitting signal. The transmitting signal sent to the transmit/receive switch circuit 9 is then output outside from a first antenna 11 or a second antenna 12 via an antenna switch circuit 10. On the contrary, a signal received through the first antenna 11 or the second antenna 12 is sent to a demodulation section 7b of the modulator/demodulator 7 via the antenna switch circuit 10, the transmit/receive switch circuit 9, and a receiver 13. The receiver 13 is a circuit which adjusts or converts the level of the received signal. The demodulation section 7b of the modulator/demodulator 7 demodulates the received signal to obtain demodulated received data. The received data is sent in serial from the demodulation section 7b to the parallel/serial converter 6.

The transmit/receive switch circuit 9 switches the output of the driver 8 and the input of the receiver 13 to connect one of them to the antenna switch circuit 10. This switching is controlled by a transmit/receive switch signal sent from the controller 1. The antenna switch circuit 10 switches the first and second antennas 11 and 12 to connect one of them to the transmit/receive switch circuit 9. This switching is controlled by an antenna switch signal sent from the controller 1. The first and second antennas 11 and 12 are transmitting/receiving antennas usable both for transmission and receiving, which are disposed at positions different from each other to effect the space diversity. Thus, at the transmission of data in which the transmit/receive switch circuit 9 selects the output of the driver 8, the antenna switch circuit 10 selects one of the antennas to be used as the transmitting antenna. On the contrary, at the receiving of data in which the transmit/receive switch circuit 9 selects the input of the receiver 13, the antenna switch circuit 10 selects one of the antennas to be used as the receiving antenna.

In the terminal unit with above configuration, the controller 1 directly executes a program stored in the memory 3 or executes a program loaded to the temporary memory 2. Transmitting data and received data are processed in accordance with direct instructions written in the program or instructions input via the input device 4 during the execution of the program. Transmitting data and received data are actually processed by the controller 1 which executes transmission/receiving programs stored in the memory 3 or transmission/receiving programs loaded to the temporary memory 2. In the execution of the transmission/receiving programs, a portion of the temporary memory 2 is used as a buffer or other work areas as required.

The case where the controller 1 conducts the transmission operation in accordance with the transmission program will be described. First, the controller 1 sends the transmit/receive switch signal to the transmit/receive switch circuit 9 to connect the output of the driver 8 to the antenna switch circuit 10. The controller 1 also sends the antenna switch signal to the antenna switch circuit 10, if required, to switch the first and second antennas 11 and 12. The controller 1 can also switch the first and second antennas 11 and 12 at a later stage during the transmission operation by sending the antenna switch signal appropriately. Transmitting data has been stored in the temporary memory 2 or the memory 3 or is input via the input device 4. The controller 1 sends the transmitting data to the parallel/serial converter 6 without processing or after processing such as data compression. In general, transmitting data is divided into a plurality of blocks every predetermined length of data, and each block is provided with a redundant code for error detection and error correction before being sent to the parallel/serial converter 6. The transmitting data is converted into serial data by the parallel/serial converter 6 and then modulated by the modulation section 7a of the modulator/demodulator 7 to obtain a transmitting signal. The transmitting signal then passes through the driver 8, the transmit/receive switch circuit 9, and the antenna switch circuit 10 to be output from the first or second antenna 11 or 12.

Then, the case where the controller 1 conducts the receiving operation in accordance with the receiving program will be described. First, the controller 1 sends the transmit/receive switch signal to the transmit/receive switch circuit 9 to connect the antenna switch circuit 10 to the input of the receiver 13. The controller 1 also sends the antenna switch signal to the antenna switch circuit 10, if required, to switch the first and second antennas 11 and 12. The controller 1 can also switch the first and second antennas 11 and 12 at a later stage during the receiving operation by sending the antenna switch signal appropriately. Data received via the first or second antenna 11 or 12 is sent to the demodulation section 7b of the modulator/demodulator 7 through the antenna switch circuit 10, the transmit/receive switch circuit 9, and the receiver 13. The received data is demodulated by the demodulation section 7b and then converted into parallel data by the parallel/serial converter 6 to be sent to the controller 1. In general, the controller 1 conducts error detection and error correction of the received data based on the redundant code attached to each block of the data. The received data is stored in the temporary memory 2 or the memory 3 without processing or after processing such as data recovery, and directly handed over to the execution program or output to the output device 5.

The first and second antennas 11 and 12 can be switched during the transmission/receiving operations when an antenna switch requiring factor occurs, for example, when the same data is re-transmitted on the transmitter side, when a data receiving error occurs on the receiver side, or when the data receiving level is low on the receiver side. In such a case, if only the receiving antenna of the terminal unit on the receiver side is switched when a data receiving error occurs on the receiver side, for example, the resultant effect of the space diversity is just the same as that obtained conventionally. Accordingly, when an antenna switch requiring factor occurs on either the transmitter side or the receiver side, it is required to switch both the transmitting and receiving antennas of the terminal units on the transmitter and receiver sides by allowing the other side to know the occurrence of the factor by itself or by notice. However, a trouble arises when an antenna switch requiring factor is shared by the two terminal units and the first and second antennas 11 and 12 are always switched simultaneously on the transmitter and receiver sides. That is, assume that the first antenna 11 has been selected on both the transmitter and receiver sides. When the first antenna 11 is switched to the second antenna 12 on the transmitter side, the first antenna 11 on the receiver side is also switched to the second antenna 12. This means that data transmission/receiving through the combination of the first antenna 11 on one side and the second antenna 12 on the other side is never realized.

The above trouble where the same combination of the transmitting and receiving antennas is repeated unnecessarily or a certain combination thereof is never realized can be solved by employing the following method. That is, the transmission and receiving programs in the terminal units on the transmitter and receiver sides may be programmed so that, whenever an antenna switch requiring factor occurs, the antennas on the both sides should be switched in accordance with an antenna switch procedure where four combinations of the transmitting and receiving antennas shown in Table 1 are realized sequentially.

TABLE 1

|  | Transmitting antenna | Receiving antenna |
| --- | --- | --- |
| Combination 1 | first antenna | first antenna |
| Combination 2 | first antenna | second antenna |
| Combination 3 | second antenna | first antenna |
| Combination 4 | second antenna | second antenna |

Specifically, in the case where the transmitting and receiving antennas are in combination 1 in Table 1, when an antenna switch requiring factor occurs, the first antenna 11 is switched to the second antenna 12 only in the terminal unit on the receiver side, while no antenna switching is conducted in the terminal unit on the transmitter side, so as to realize combination 2. Here, the antenna switch requiring factor is, for example, an increase in the bit error rate. Then, when a next antenna switch requiring factor occurs, the second antenna 12 is switched to the first antenna 11 in the terminal unit on the receiver side, while the first antenna 11 is switched to the second antenna 12 in the terminal unit on the transmitter side, so as to realize combination 3. Combination 3 is switched to combination 4 when another antenna switch requiring factor occurs, and combination 4 is returned to combination 1 when yet another antenna switch requiring factor occurs. The antenna switch processing is thus repeated in accordance with this antenna switch procedure. According to this procedure, the number of times of the switching in the antenna switch processing where the first antenna 11 and the second antennas 12 are switched on at least one of the transmitter and receiver sides is four, which is equal to the total of the two transmitting antennas and the two receiving antennas. Accordingly, all the four combinations shown in Table 1 can be realized. The switching described in the above method is performed at a timing of, for example, a border between adjacent packets of information in time axis.

The antenna switch processing according to the above antenna switch procedure is conducted in the following manner. A combination table as shown in Table 1, for example, is stored in a portion of the temporary memory 2, while a pointer indicating the current combination in the combination table is stored in another portion of the temporary memory 2. Whenever the antenna switch processing is conducted, the pointer is shifted by one, and the current combination and the previous combination are compared, to determine whether or not the first antenna 11 and the second antenna 12 should be switched on the transmitter and receiver sides and switch if required.

In order to switch the transmitting and receiving antennas on the transmitter and receiver sides as described above whenever an antenna switch requiring factor occurs, both the terminal units on the transmitter and receiver sides must be informed of the occurrence of the factor. The transmitting and receiving antennas may be switched independently on the transmitter and receiver sides without being synchronized. In this case, since the switchings on the transmitter and receiver sides are not synchronous, all the combinations of the first and second antennas 11 and 12 can be realized by shifting the switch timings from each other. Alternatively, the switch periods on the transmitter and receiver sides may be made different from each other or the antennas only on one side may be switched. In these cases, all the combinations will be finally realized after repeating the switching even if the switching starts simultaneously on the two sides, though some combination may appear more often than others. Alternatively, the transmitting antennas of the terminal unit on the transmitter side may be switched sequentially at predetermined intervals to allow re-transmission only under such a deteriorated radio wave circumstance that no response to first transmission is received from the terminal unit on the receiver side. Then, once the transmitting antenna which can receive a response from the receiver side is selected, only the receiving antennas of the terminal unit on the receiver side can be switched depending on the receiving level and the like.

Thus, by using the terminal units with the above configuration to transmit/receive data therebetween, not only the first and second antennas 11 and 12 as the receiving antennas of the terminal unit on the receiver side, but also the first and second antennas 11 and 12 as the transmit antennas of the terminal unit on the transmitter side can be switched. Accordingly, a variety of combinations of the transmitting and receiving antennas can be realized, compared with a terminal unit employing the conventional space diversity method where only the transmitting or receiving antennas on the transmitter or receiver side are switched. This makes it possible to transmit/receive data in a complicate radio wave circumstance, as well as increasing the possibility of better data transmission/receiving in a same radio wave circumstance.

Moreover, since the transmitting and receiving antennas are switched in accordance with a predetermined antenna switch procedure, it is assured that all the four combinations of the two transmitting antennas and the two receiving antennas disposed on the transmitter and receiver sides, respectively, can be utilized to achieve the space diversity. All the four combinations of the transmitting and receiving antennas can also be realized when the transmitting and receiving antennas are switched on the transmitter and receiver sides independently from each other, though some combination(s) may appear twice or more before all the combinations appear.

In the first example shown in FIG. 1, the detection of the bit error rate and the reception error can be performed.

(EXAMPLE 2)

Figure 2:
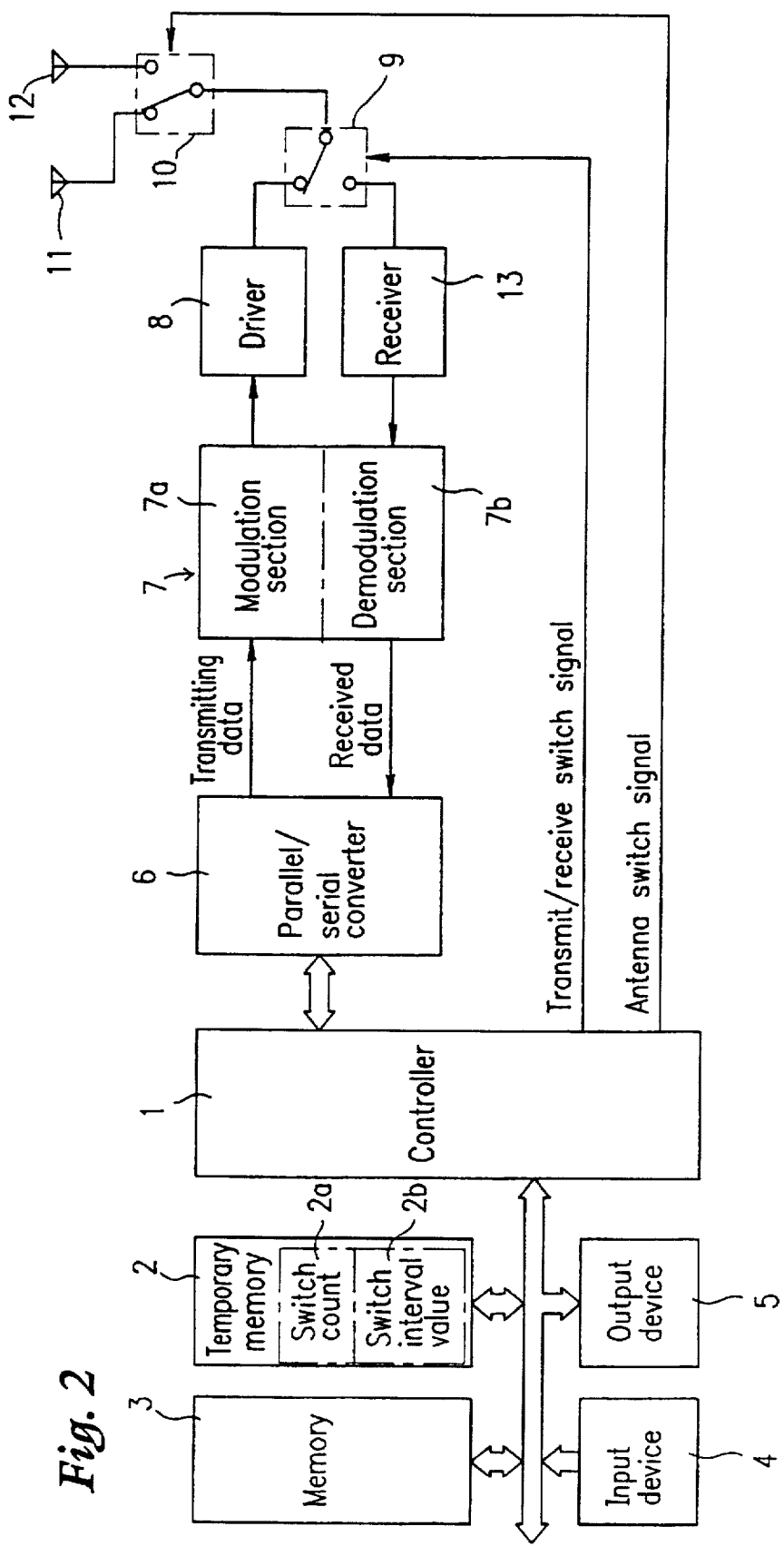
FIG. 2 is a block diagram showing the configuration of a terminal unit of Example 2 according to the present invention.

Referring to FIG. 2, the second example of the present invention will be described. FIG. 2 is a block diagram showing the configuration of a terminal unit of Example 2.

In Example 2, a specific configuration of the terminal unit for conducting the antenna switch processing in accordance with the antenna switch procedure described in Example 1 will be described. Components having the same functions as those in Example 1 shown in FIG. 1 are denoted by the same reference numerals, and the description thereof is omitted.

In Example 2, the temporary memory 2 of each of the terminal units on the transmitter and receiver sides includes a switch count area 2a for storing the number of times of switching and a switch interval area 2b for storing a switch interval value. The switch count stored in the switch count area 2a corresponds to the number of times of the antenna switch processing executed in the transmission or receiving program due to the occurrence of an antenna switch requiring factor. When the transmission/receiving is conducted only between two terminal units of the same type, the switch counts on the transmitter and receiver sides are increased simultaneously. The switch interval values stored in the switch interval areas 2b on the transmitter and receiver sides are constants set differently, which are loaded from the memory 3 and the like. In general, it is appropriate that the switch interval value is set at "1" on one side, while on the other side it is set at a value equal to the number of antennas disposed on the different side. In this example, therefore, the value is vet at "1" on the receiver side and "2" on the transmitter side.

When an antenna switch requiring factor is detected and the antenna switch processing is executed, the transmission and receiving programs in the terminal units on both sides aria programmed to increment the switch count in the switch count area 2a and read the switch count au well as the switch interval value in the switch interval area 2b, only when the remainder of the switch count divided by the switch interval value is "0" (mod [modulo] operation), the antenna switch signal is sent to the antenna switch circuit 10 to switch the first and second antennas 11 and 12.

With the above configuration, the switch interval value on the transmitter side is set at "2", while that on the receiver side is set at "2". Assuming that the first antennas 11 are initially selected as the transmitting antenna and the receiving antenna on the transmitter and receiver sides, the transmission and receiving programs in the terminal units on the transmitter and receiver sides are programmed to conduct the antenna switch processing as shown in Table 2 below.

TABLE 2

| | Transmitter side | | Receiver side | |
|---|---|---|---|---|
| Antenna switch processing | Switch count mod 2 | Transmitting antenna | Switch count mod 1 | Receiving antenna |
| Initial state | — | first antenna | — | first antenna |
| First | 1 mod 2 = 1 | first antenna | 1 mod 1 = 0 | second antenna |
| Second | 2 mod 2 = 0 | second antenna | 2 mod 1 = 0 | first antenna |
| Third | 3 mod 2 = 1 | second antenna | 3 mod 1 = 0 | second antenna |
| Fourth | 4 mod 2 = 0 | first antenna | 4 mod 1 = 0 | first antenna |

In the first antenna switch processing, the transmission program on the transmitter side calculates 1 mod 2=1, that is, calculates the remainder of the switch count "1" divided by the switch interval value "2" and obtains "1". Accordingly, the antenna switch signal is not sent to the antenna switch circuit 10. On the contrary, the receiving program on the receiver side calculates 1 mod 1=0 and obtains "0". Accordingly, the antenna switch signal is sent to the antenna switch circuit 10 to allow the first antenna 11 to be switched to the second antenna 12. In the subsequent antenna switch processings, as in the first processing, the remainder of the switch count divided by the switch interval value is calculated, and the first and second antennas 11 and 12 are switched to each other only when the calculation result is "0". The result of this procedure is as shown in Table 2, where the first and second antennas 11 and 12 are switched every other antenna switch processing on the transmitter side, while they are switched every antenna switch processing on the receiver side. After the antenna switch processing is executed four times, all of the four combinations of the transmitting and receiving antennas shown in Table 1 have been realized. When the switch count is a multiple of "4" as the fourth antenna switch processing, the combination of the transmitting and receiving antennas returns to the initial state where the first antennas 11 are selected on both sides.

Thus, according to this example, whenever the antenna switch processing is executed due to the occurrence of an antenna switch requiring factor, the terminal units on the transmitter and receiver sides calculate the remainder of the switch count divided by the switch interval individually and determine whether or not the first and second antennas 11 and 12 should be switched. Accordingly, it is ensured that all of the four combinations of the two transmitting antennas and the two receiving antennas can be realized. Moreover, since the antenna switch procedure is determined only by the switch count and the switch interval value stored in the switch count area 2a and the switch interval area 2b, respectively, it is not necessary to store a combination table as shown in Table 1. Thus, the temporary memory 2 can be effectively used especially in the case where three or more antennas are disposed for each terminal unit.

According to the antenna switch procedure described above, all of the four combinations of the transmitting and receiving antennas can be realized by executing the antenna switch processing four times even in the case where the initial states of the transmitting and receiving antennas are different and the case where the switch count values on the transmitter and receiver sides are different.

(EXAMPLE 3)

Figure 3:
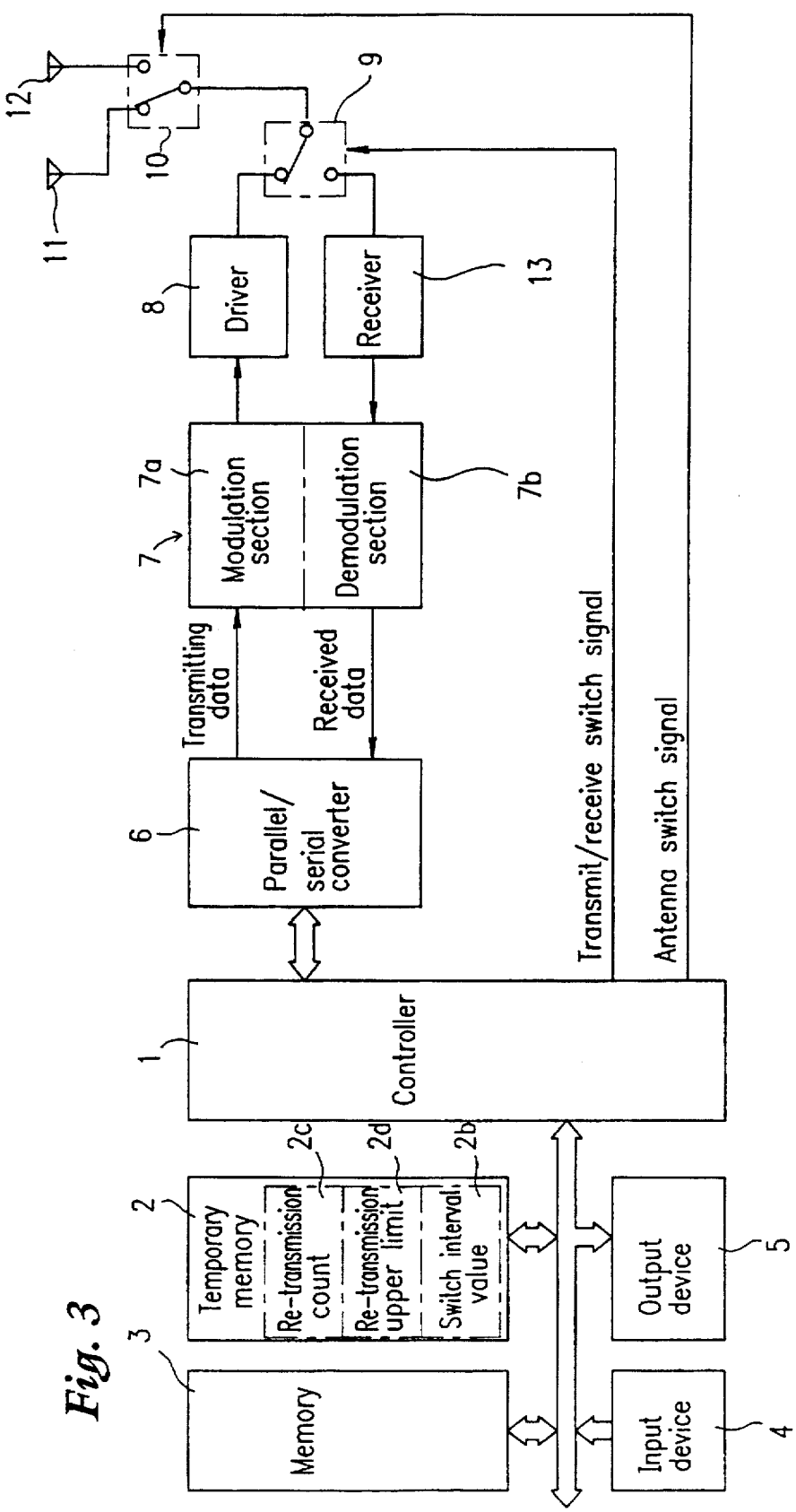
FIG. 3 is a block diagram showing the configuration of a terminal unit of Example 3 according to the present invention.
Figure 4:
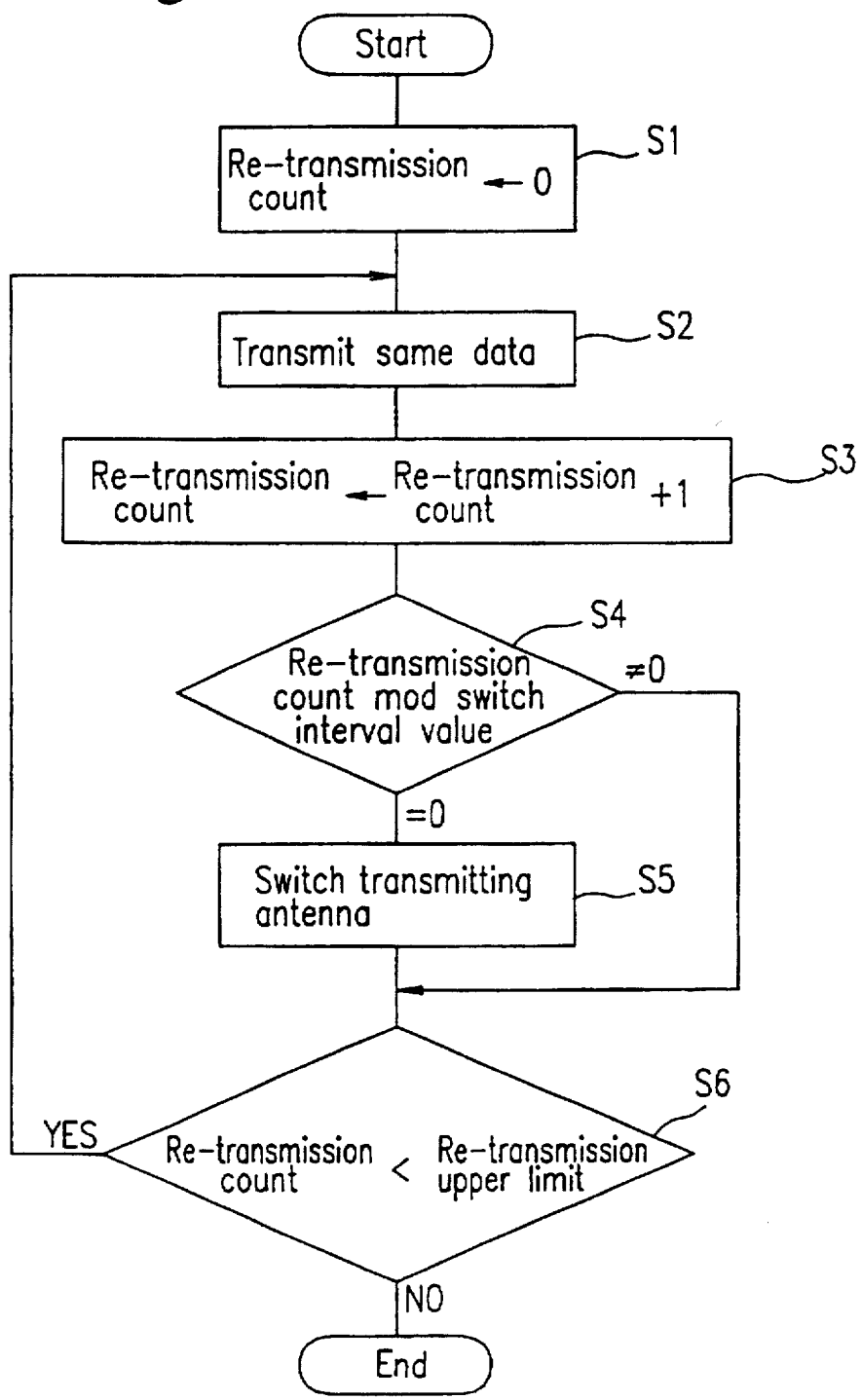
FIG. 4 is a flowchart of a transmission program used on the transmitter side in Example 3.

Referring to FIGS. 3 and 4, the third example of the present invention will be described. FIG. 3 is a block diagram showing the configuration of a terminal unit of Example 3. FIG. 4 is a flowchart of a transmission program used on the transmitter side in this example.

In Example 3, a specific example of an antenna switch requiring factor which may occur in the terminal unit of Example 2 will be described. Components having the same functions as those in Examples 1 and 2 shown in FIGS. 1 and 2 are denoted by the same reference numerals, and the description thereof is omitted.

In this example, the case where same data is repeatedly re-transmitted by a predetermined number of times through sequentially changed combinations of the transmitting and receiving antennas will be described. This means that an antenna switch requiring factor occurs every re-transmission. Referring to FIG. 3, the temporary memory 2 of each of the terminal units on the transmitter and receiver sides includes a re-transmission count area 2c for storing the number of times of re-transmission, a re-transmission upper limit area 2d for storing a re-transmission upper limit value, and the switch interval area 2b for storing the switch interval value. The re-transmission count stored in the re-transmission count area 2c corresponds to a value obtained by counting the number of times of re-transmission of same data. The re-transmission counts on the transmitter and receiver sides are always the same. In this example, since the antenna switch processing is executed every re-transmission, the re-transmission count is substantially the same as the switch count. The re-transmission upper limit stored in the re-transmission upper limit area 2d is a constant shared by the transmitter and receiver sides, indicating the number of times of transmission allowed for same data. In this example, the re-transmission upper limit is set at "4" because the number of combinations of the transmitting and receiving antennas is 4. The setting of the switch interval value stored in the switch interval area 2b is as described in Example 2.

Referring to FIG. 4, the procedure of the transmission program in the terminal unit on the transmitter side will be described. At the start of transmission, the re-transmission count in the re-transmission count area 2c is initialized to "0" (step S1). Transmitting data is transmitted (step S2), incrementing the re-transmission count to "1" (step S3). Then, as the antenna switch processing, the remainder of the re-transmission count divided by the switch interval value in the switch interval area 2b is calculated (step S4). If the remainder is "0", the antenna switch signal is sent to the antenna switch circuit 10 to switch the first and second antennas 11 and 12 on the transmitter side (step S5). If the remainder is not "0", the transmitting antenna is not switched. In this example, since the switch interval value on the transmitter side is set at "2", the switching of the transmitting antenna is conducted every other antenna switch processing of the steps S2 and S3. Thereafter, the re-transmission count and the re-transmission upper limit in the re-transmission upper limit area 2d are compared (step S6). If the re-transmission count has not reached the upper limit, the process returns to step S2 to re-transmit the same transmitting date. When the same transmitting data is transmitted four times by repeating the steps S2 through S6, the re-transmission count reaches "4" which is equal to the re-transmission upper limit in step S6. Then, the transmission operation is terminated.

The terminal unit on the receiver side conducts a receiving operation similar to the above-described transmission operation. The re-transmission count is increased every time the data is received. The receiving antenna is switched between the first and second antennas 11 and 12 depending on the calculation result of the remainder of the re-transmission count divided by the switch interval value. Since the switch interval value on the receiver side is set at "1" in this example, the receiving antenna is switched every antenna switch processing. Accordingly, every time same transmitting data is re-transmitted, the combination of the transmitting and receiving antennas changes sequentially from the initial state through the state at the third antenna switch processing shown in Table 2. Thus, it is possible to transmit same data through all the four combinations of the transmitting and receiving antennas.

Thus, according to this example, same transmitting data is re-transmitted four times in accordance with the antenna switch procedure as described in Example 2. It is therefore possible to transmit/receive same data through all the combinations of the four transmitting and receiving antennas. This makes it possible for the terminal unit on the receiver side to select data with the best receiving conditions among four same data repeatedly received or to synthesize data from a plurality of received data appropriately. Thus, effective received data which is significantly less influenced by fading can be obtained even under a complicate radio wave circumstance.

In the case where the transmitting data is divided into a plurality of blocks before being transmitted, the operation shown in FIG. 4 can be conducted for every block. In FIG. 4, the antenna switch processing (steps S4 and S5) is executed after the fourth transmission of same data, to return the combination of the transmitting and receiving antennas to the initial state. Alternatively, the processing in step S6 may follow immediately after the fourth transmission in step S2 to terminate the transmission operation. In this case, though the initial state of the transmitting and receiving antennas changes at the next transmission operation, no trouble will arise.

The antenna switch processing was executed every re-transmission. Alternatively, it may be executed every time re-transmission is repeated a plurality of times.

(EXAMPLE 4)

Figure 5:
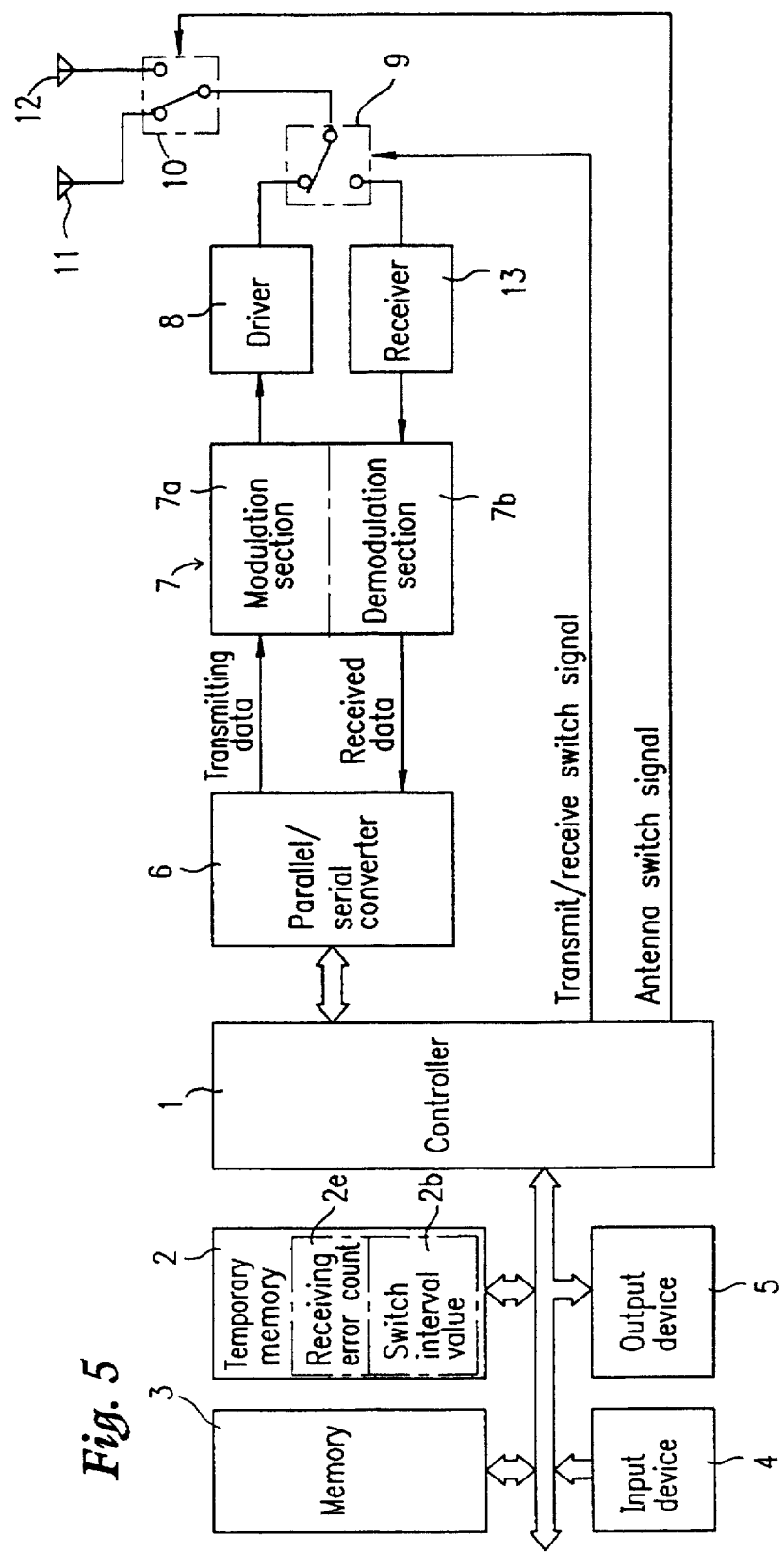
FIG. 5 is a block diagram showing the configuration of a terminal unit of Example 4 according to the present invention.
Figure 6:
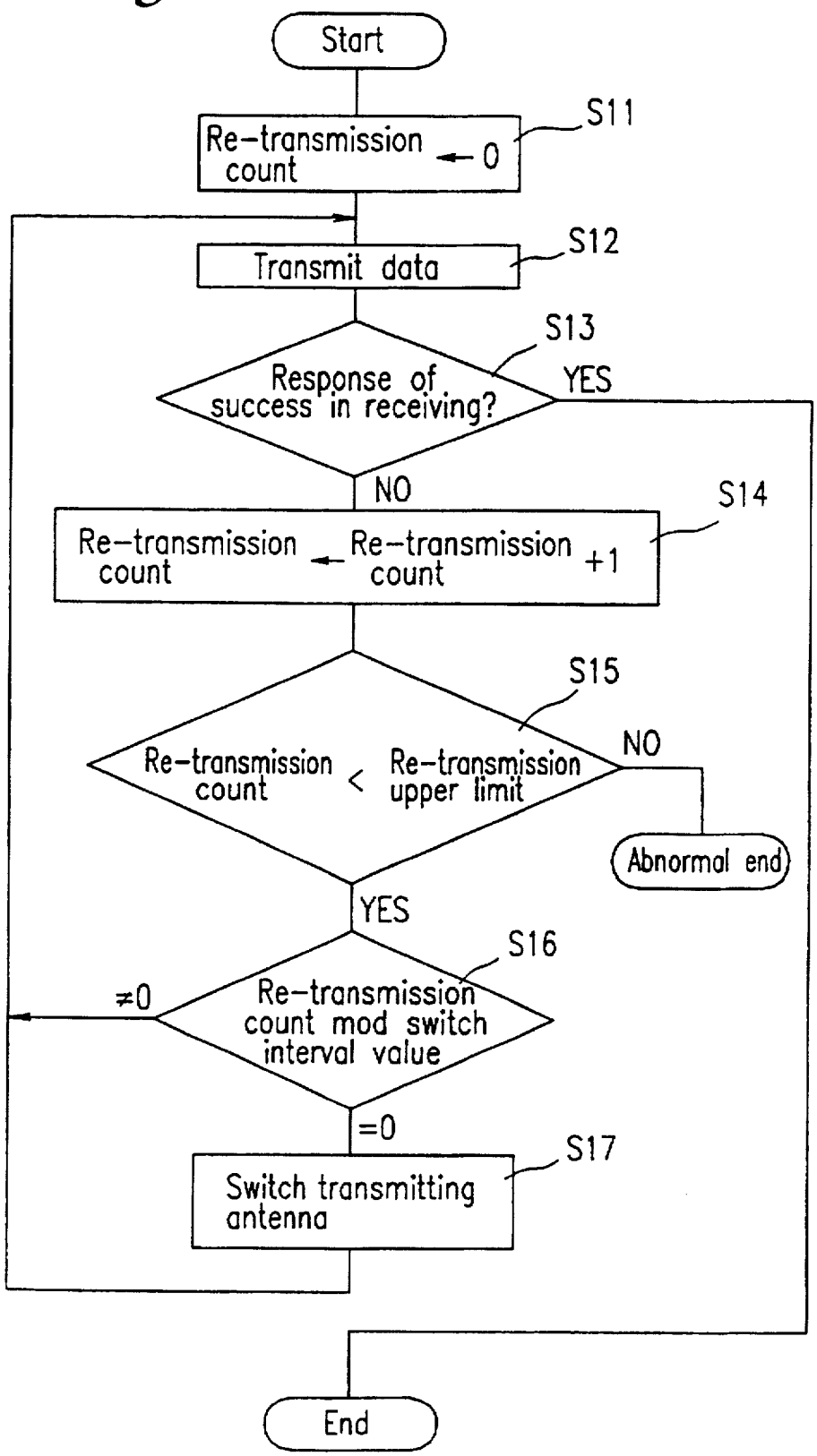
FIG. 6 is a flowchart of a transmission program used on the transmitter side in Example 4.
Figure 7:
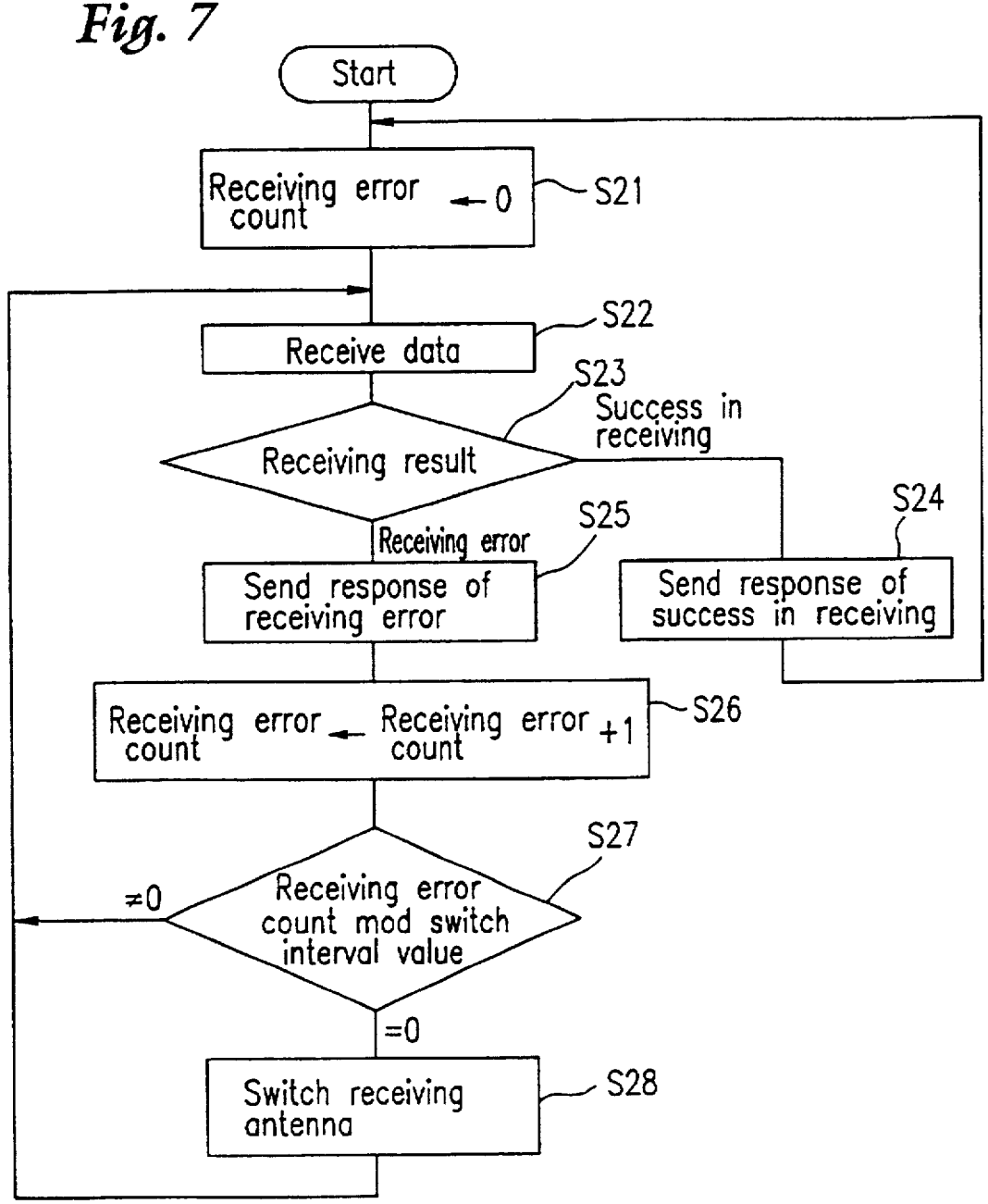
FIG. 7 is a flowchart of a receiving program used on the receiver side in Example 4.

Referring to FIGS. 5 to 7, the fourth example of the present invention will be described. FIG. 5 is a block diagram showing the configuration of a terminal unit on the receiver side of Example 4. FIG. 6 is a flowchart of a transmission program on the transmitter side. FIG. 7 is a flowchart of a receiving program on the receiver side.

In Example 4, another example of an antenna switch requiring factor which may occur in the terminal unit of Example 2 will be described. Components having the same functions as those in Examples 1 and 2 shown in FIGS. 1 and 2 are denoted by the same reference numerals, and the description thereof is omitted.

In this example, the case where the combination of the transmitting and receiving antennas is changed only when an receiving error occurs on the receiver side to re-transmit same data will be described. In this example, therefore, an antenna switch requiring factor occurs every time date is re-transmitted due to a receiving error. The hardware configuration of the terminal unit on the transmitter side is the same as that shown in Example 3. Referring to FIG. 5, the temporary memory 2 of the terminal unit on the receiver side includes a receiving error count area 2e for storing the number of receiving errors and the switch interval area 2b for storing the switch interval value. The receiving error count stored in the receiving error count area 2e corresponds to the number of times counted every time an uncorrectable error is detected in received data and determined as a receiving error. The setting of the switch interval value stored in the switch interval area 2b is as described in Example 2.

In general, in digital data transmission, an error detection code and an error correction code are attached to transmitting data before the data is transmitted. A receiving program on the receiver side is programmed to detect an error in the received data and correct it, as required, based on these redundant codes. When the detected error is uncorrectable, the terminal unit in the receiver side recognizes it as an receiving error and sends a response indicating the error to the transmitter side, requesting re-transmission of the same data. The terminal unit on the transmitter side re-transmits the data only upon receipt of the response indicating an error from the receiver side. The case where data has not reached the received side due to failure in receiving the data can also be treated as the receiving error. If no redundant code is attached to transmitting data, the receiving error arises only in the case of failure in receiving date.

The receiving error count is therefore counted simultaneously with the re-transmission count in the re-transmission count area 2c shown in FIG. 3 on the transmitter side, and the receiving error count and the re-transmission count are substantially the same as the switch count in Example 2. The response from the receiver side itself may include an error. In general, therefore, the transmission program on the transmitter side is programmed to re-transmit same date when no response indicating success in receiving date is received from the receiver side. When the response from the receiver side includes an error as described above, the receiving error count on the receiver side and the re-transmission count on the transmitter side may become different from each other. In this example, the re-transmission upper limit in the re-transmission upper limit area 2d shown in FIG. 3 is used to terminate the transmission operation abnormally. Accordingly, though the upper limit value may be set at "4" corresponding to the number of combinations of the transmitting and receiving antennas as in Example 3, it may also be set at a value larger than "4".

Referring to FIG. 6, the procedure of the transmission program in the terminal unit on the transmitter side will be described. At the start of transmission, the re-transmission count in the re-transmission count area 2c is initialized to "0" (step S11). Transmitting data is transmitted (step S12) and then a response from the receiver side is waited for (step S13). If a response indicating success in receiving the data is received from the receiver side, the transmission of the current transmitting data is terminated. If a response indicating a receiving error is received from the receiver side or no response indicating success in receiving the data is received within a predetermined period of time, the re-transmission count is increased by "1" (step S14), and then the re-transmission count and the re-transmission upper limit are compared (step S15). If the re-transmission count has not reached the upper limit, the remainder of the re-transmission count divided by the switch interval value is calculated as the antenna switching processing (step S16). If the remainder is "0", the transmitting antenna is switched (step S17). If the remainder is not "0", the transmitting antenna is not switched. In this example, since the switch interval value on the transmitter side is set at "2", the transmitting antenna is switched every other antenna switch processing. Then, the process returns to step S12 to re-transmit the same date, and the processings in steps S12 to S17 are repeated until a response indicating success in receiving the data is received from the receiver side. If the re-transmission count reaches the re-transmission upper limit, the transmission operation is terminated abnormally, concluding that any combination of the transmitting and receiving antennas will cause a receiving error or that too many receiving errors are found. In the case where the transmitting data is divided into a plurality of blocks before being transmitted, the operation shown in FIG. 6 can be conducted for every block.

Referring to FIG. 7, the procedure of the receiving program in the terminal unit on the receiver side will be described. First, after the receiving error count in the receiving error count area 2e is initialized to "0" (step S21), the transmitted data is received (step S22), and the receiving result is examined (step S23). If the data is successfully received, a response indicating the success is sent to the transmitter side (step S24). The process returns to step S21 to initialize the receiving error count and waits for next date transmission (step S22). Even if data is consecutively transmitted from the same terminal unit, the control of the antenna switch processing with the receiving error count is no more required. Accordingly, the receiving error count is initialized at this point to be ready for transmission from other terminal units.

If it is determined that a receiving error has occurred in step S23, a response indicating failure in receiving the data is sent to the transmitter side, requesting re-transmission of the same data (step S25). Simultaneously, the receiving error count is increased by "1" (step S26). Then, the remainder of the receiving error count divided by the switch interval value is calculated as the antenna switching processing (step S27). If the remainder is "0", the receiving antenna is switched in response to the antenna switch signal (step S28). If the remainder is not "0", the receiving antenna is not switched. In this example, since the switch interval value on the receiver side is set at "1", the receiving antenna is switched every antenna switch processing. Then, the process returns to step S22 to wait for re-transmission of the same data, and the processings in steps S22 to S28 are repeated until the re-transmission is successful. When the re-transmission is successful, the process waits for next data transmission in step S22.

In the above transmission and receiving operations, the combination of the transmitting and receiving antennas is sequentially changed with the antenna switch processing every time data is re-transmitted due to the occurrence of a receiving error. Thus, as in Example 2, all the combinations of the transmitting and receiving antennas can be realized when the antenna switching processing has been repeated four times. Therefore, according to this example, if a combination of the transmitting and receiving antennas which can provide a radio wave condition where no receiving error occurs exists among the four combinations, this combination can be selected without fail to effect data transmission/receiving free from an error. In Example 3, re-transmission was repeated for a predetermined number of times regardless of the radio wave condition. This reduces the time utilizing efficiency of data transmission. In this example, however, re-transmission is terminated once a combination of the transmitting and receiving antennas free from the occurrence of a receiving error is selected. Moreover, when subsequent data is transmitted/received between the same terminal units, the same combination of the transmitting and receiving antennas free from the occurrence of a receiving error can be used. This increases the transmission rate.

In this example, the antenna switch processing was executed every occurrence of a receiving error. Alternatively, it may be executed every time a plurality of receiving errors have occurred.

(EXAMPLE 5)

Figure 8:
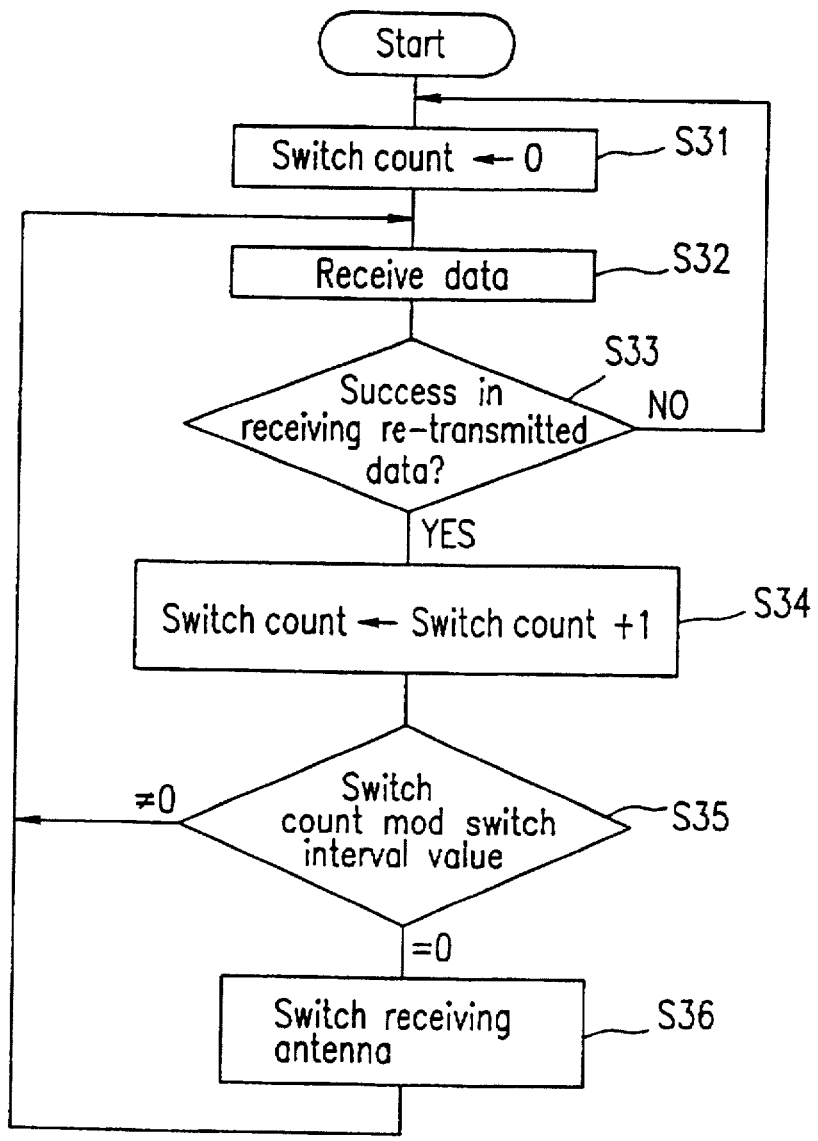
FIG. 8 is a flowchart of a receiving program used on the receiver side in Example 5.
Figure 9:
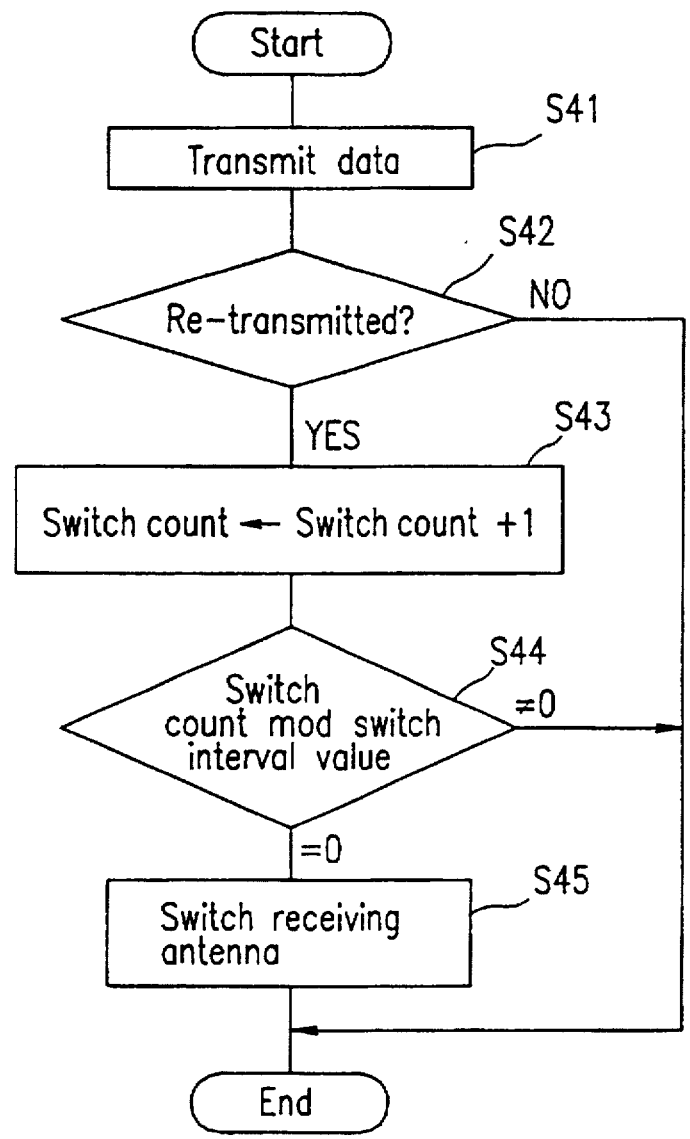
FIG. 9 is a flowchart of a transmission program used on the transmitter side in Example 5.

Referring to FIGS. 8 and 9, the fifth example of the present invention will be described. FIG. 8 is a flowchart of a receiving program on the receiver side, and FIG. 9 is a flowchart of a transmission program on the transmitter side.

In Example 5, still another example of an antenna switch requiring factor which may occur in the terminal unit of Example 2 will be described. Components having the same functions as those in Examples 1 and 2 shown in FIGS. 1 and 2 are denoted by the same reference numerals, and the description thereof is omitted.

Some communication protocols allow for automatic detection of a receiving error and re-transmission of data. When a circuit unit executing one of such protocols is used, the occurrence of individual receiving errors and the subsequent re-transmission of data cannot be detected in advance. Accordingly, it is impossible to execute the antenna switch processing every re-transmission of data due to the occurrence of a receiving error as described in Example 4. In this example, therefore, if currently received data is re-transmitted data, it is detected after the data has been received, and the antenna switch processing is conducted when the re-transmitted date has been received.

The hardware structure of the terminal units on the transmitter and receiver sides of this example is the same as that in Example 2 shown in FIG. 2. However, the parallel/serial converter 6 in this example conducts processings other than the parallel-serial conversion of transmitting date end the serial-parallel conversion of receive data. That is, the parallel/serial converter 6 on the receiver side detects a receiving error in received date any time and sends a response to the transmitter side automatically, while the parallel/serial converter 6 on the transmitter side re-transmits transmitted data automatically on receipt of the response indicating a receiving error from the receiver side. Accordingly, the controller 1 on the receiver side just receives received data from the parallel/serial converter 6, not required to conduct detection of a receiving error and other processings. Similarly, the controller 1 on the transmitter side just transmits transmitting data to the parallel/serial converter 6, not required to conduct re-transmission and other processings. However, the receiving program executed by the controller 1 on the receiver side is programmed so as to detect whether the received data has been received in the first transmission or after repeated re-transmission based on the timing at which data is sequentially received from the parallel/serial converter 6, the control signal attached to the received data, or a control signal (not shown) output from the parallel/serial converter 6. Similarly, the transmission program executed by the controller 1 on the transmitter side is programed so as to detect whether the transmitting data has been successfully received in the first transmission or after repeated re-transmission based on the timing at which the transmitting date is sequentially received by the parallel/serial converter 6 or a control signal (not shown) output from the parallel/serial converter 6.

Referring to FIG. 8, the procedure of the receiving program in the terminal unit on the receiver side will be described. First, after the switch count in the switch count area 2a is initialized to "0" (step S31), data is received (step S32), and whether or not the received data has been successfully received in the first transmission is examined (step S33). If the received date is determined to have been received in the first transmission, the process returns to step S31 to initialize the switch count and wait for next date transmission. Even if data is consecutively transmitted from the same terminal unit, the control of the antenna switch processing with the switch count is no more required. Accordingly, the switch count is initialized at this point to be ready for transmission from other terminal units. The above examination and the determination for the received data can be performed by, for example, the parity check, the sum check, the CRC check, the sequence number check, and the like.

If the received data is determined to have been received by re-transmission, the switch count is increased by "1" (step S34). Then, the remainder of the switch count divided by the switch interval value is calculated as the antenna switching processing (step S35). If the remainder is "0", the receiving antenna is switched (step S36). If the remainder is not "0", the receiving antenna is not switched. In this example, since the switch interval value on the receiver side is set at "1", the receiving antenna is switched every antenna switch processing. Then, the process returns to step S32 to wait for re-transmission of the same data.

Referring to FIG. 9, the procedure of the transmission program in the terminal unit on the transmitter side will be described. According to the transmission program, the switch count in the switch count area 2a is initialized to "0" only when the power source is on or when the terminal unit on the receiver side is changed to another terminal unit. Transmitting date is transmitted (step S41), and then whether or not the transmitting data has been re-transmitted is examined (step S42). This examination is performed by the controller 1, the temporary memory 2 and the memory 3 by checking a history of the operation. If the transmitting data is determined to have been successfully received in the first transmission, the transmission is terminated. If the transmitting data is determined to have failed in being received at least one time and have been re-transmitted, the switch count is increased by "1" (step S43). The successful reception can be detected by receiving a response from the reception side. The response is governed by a communication protocol used. In general, a packet indicating the successful reception is sent from the reception side to the transmission side. The successful reception can be determined by receiving this packet. Then, the remainder of the switch count divided by the switch interval value is calculated as the antenna switching processing (step S44). If the remainder is "0", the transmitting antenna is switched (step S45). If the remainder is not "0", the transmitting antenna is not switched. In this example, since the switch interval value on the transmitter side is set at "2", the transmitting antenna is switched every other antenna switch processing of the steps S42, S43 and S44. After the antenna switch processing is complete, the transmit operation is terminated.

In the above transmission and receiving operations, if a receiving error has occurred and data has been re-transmitted, it is detected after the data has been re-transmitted, and the combination of the transmitting and receiving antennas is sequentially changed with the antenna switch processing every time the re-transmission is detected. Thus, as in Example 2, all the combinations of the transmitting and receiving antennas can be realized when the antenna switching processing has been repeated four times. In this example, however, detection of a receiving error and re-transmission of data are automatically conducted by the parallel/serial converter 6 and the like independently from the transmission end receiving programs. Accordingly, the antenna switch processing is executed only once for each transmission/receiving operation. The combination of the transmitting and receiving antennas cannot be sequentially changed unless transmission/receiving is continuously conducted between the same terminal units. For this reason, as shown in FIG. 8, when the antenna switch processing is executed (steps S35 and S36), the receiving program on the receiver side is programmed to wait for next data transmission in step S32 without initializing the switch count. Similarly, when data is transmitted to the same terminal unit, the transmission program on the transmitter side is programmed to transmit data without initializing the switch count.

Thus, according to this example, if a combination of the transmitting and receiving antennas which can provide a radio wave condition where no receiving error occurs exists among the four combinations, this combination can be selected without fail to effect data transmission/receiving free from an error. Moreover, unlike Example 4, even in a system using a communication protocol where detection of a receiving error and re-transmission of data are automatically conducted, effective antenna switch processing can be executed without the necessity of detection of a receiving error and re-transmission of data in the transmission and receiving programs.

In this example, the antenna switch processing was executed every occurrence of a receiving error. Alternatively, it may be executed every time a plurality of receiving errors have occurred.

(EXAMPLE 6)

Figure 10:
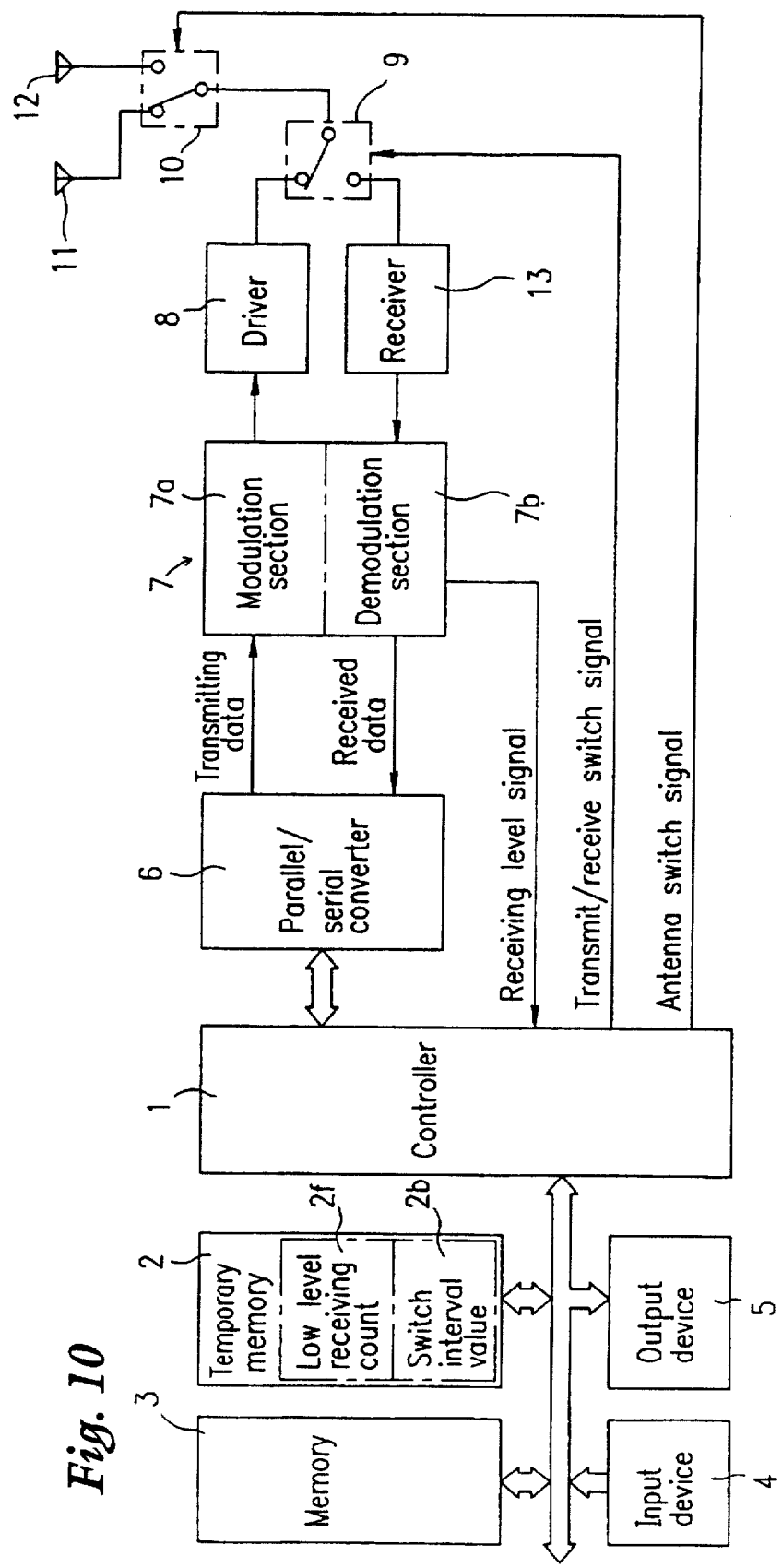
FIG. 10 is a block diagram showing the configuration of a terminal unit on the receiver side of Example 6 according to the present invention.
Figure 11:
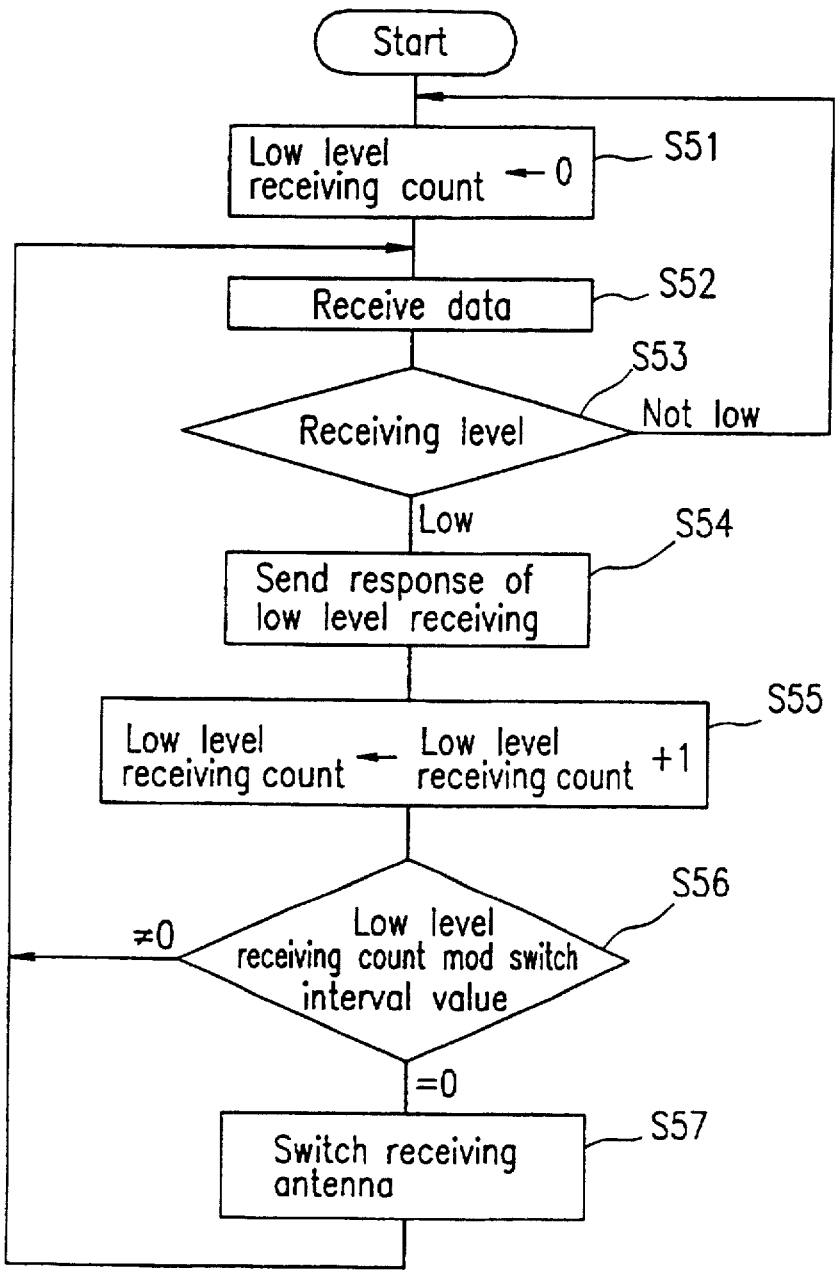
FIG. 11 is a flowchart of a receiving program used on the receiver side in Example 6.

Referring to FIGS. 10 and 11, the sixth example of the present invention will be described. FIG. 10 is a block diagram showing the configuration of a terminal unit of Example 6. FIG. 11 is a flowchart of a receiving program on the receiver side.

In Example 6, still another example of an antenna switch requiring factor which may occur in the terminal unit of Example 2 will be described. Components having the same functions as those in Examples 1 and 2 shown in FIGS. 1 and 2 are denoted by the same reference numerals, and the description thereof is omitted.

In this example, the combination of the transmitting and receiving antennas is changed when the receiving level on the receiver side is low. The hardware configuration of the terminal unit on the transmitter side is the same au that in Example 2 shown in FIG. 2. Referring to FIG. 10, a temporary memory 2 of the terminal unit on the receiver side includes a low level receiving count area $2f$ for storing a low level receiving count and the switch interval area $2b$ for storing the switch interval value. The low level receiving count stored in the low level receiving count area $2f$ corresponds to the number of times of the detection of low level received data. This detection is accomplished by detecting the signal level and the like of received data in the demodulation section $7b$ of the modulator/demodulator 7. The detection result is sent to the controller 1 as a receiving level signal. The detection of low level receiving is announced to the transmitter side, which therefore becomes a common antenna switch requiring factor on both the transmitter and receiver sides. Accordingly, the low level receiving count on the receiver side is increased simultaneously with the increment of the switch count on the transmitter side, and the values of the two counts are substantially the same. The setting of the switch interval value stored in the switch interval area $2b$ is as described in Example 2.

Referring to FIG. 11, the procedure of the receiving program in the terminal unit on the receiver side will be described. First, after the low level receiving count in the low level receiving count area $2f$ is initialized to "0" (step S51), data is received (step S52), and the receiving level is examined (step S53). If the receiving level is not low, the process returns to step S51 to initialize the low level receiving count and waits for next data transmission (step S52). Even if data is consecutively transmitted from the same terminal unit, the control of the antenna switch processing with the low level receiving count is no more required. Accordingly, the low level receiving count is initialized at this point to be ready for transmission from other terminal units.

If the receiving level is determined to below in step S53, a response indicating the low level receiving is sent to the transmitter side (step S55). Simultaneously, the low level receiving count is increased by "1" (step S55). Then, the remainder of the low level receiving count divided by the switch interval value is calculated as the antenna switching processing (step S56). If the remainder is "0", the receiving antenna is switched (step S57). If the remainder is not "0", the receiving antenna is not switched. In this example, since the switch interval value on the receiver side is set at "1", the receiving antenna is switched every antenna switch processing. Then, the process returns to step S52 to wait for next data transmission.

The procedure of the transmission program in the terminal unit on the transmitter side is substantially the same as that in Example 5 shown in FIG. 9. The difference is that the examination of whether or not the transmitting data has been re-transmitted in step S42 is replaced with the examination of whether or not a response indicating low level receiving has been received from the receiver side. When received, the switch count is increased (step S43) and the antenna switch processing is conducted (steps S44 and S45).

In the above transmission/receiving operations, the combination of the transmitting and receiving antennas is sequentially changed with the antenna switch processing every time low level receiving is detected. Thus, as in Example 2, all the combinations of the transmitting and receiving antennas can be realized when the antenna switching, processing has been repeated four times. In this example, however, re-transmission is not conducted even when the receiving level is low. Accordingly, the antenna switch processing is executed only once for each transmission/receiving operation. The combination of the transmitting and receiving antennas cannot be sequentially changed unless transmission/receiving is continuously conducted between the same terminal units. For this reason, as shown in FIG. 11, when the antenna switch processing is executed (steps S56 and S57), the receiving program on the receiver side is programmed to wait for next data transmission in step S52 without initializing the low level receiving count. Similarly, when data is transmitted to the same terminal unit, the transmission program on the transmitter side is programmed to transmit date without initializing the switch count.

Thus, according to this example, if a combination of the transmitting and receiving antennas which can provide a radio wave condition where the receiving level is not low exists among the four combinations, this combination can be selected without fail to effect better data transmission/receiving.

In this example, the antenna switch processing was executed every time low level receiving is detected. Alternatively, it may be executed every time low level receiving is detected a plurality of times.

(EXAMPLE 7)

Figure 12:
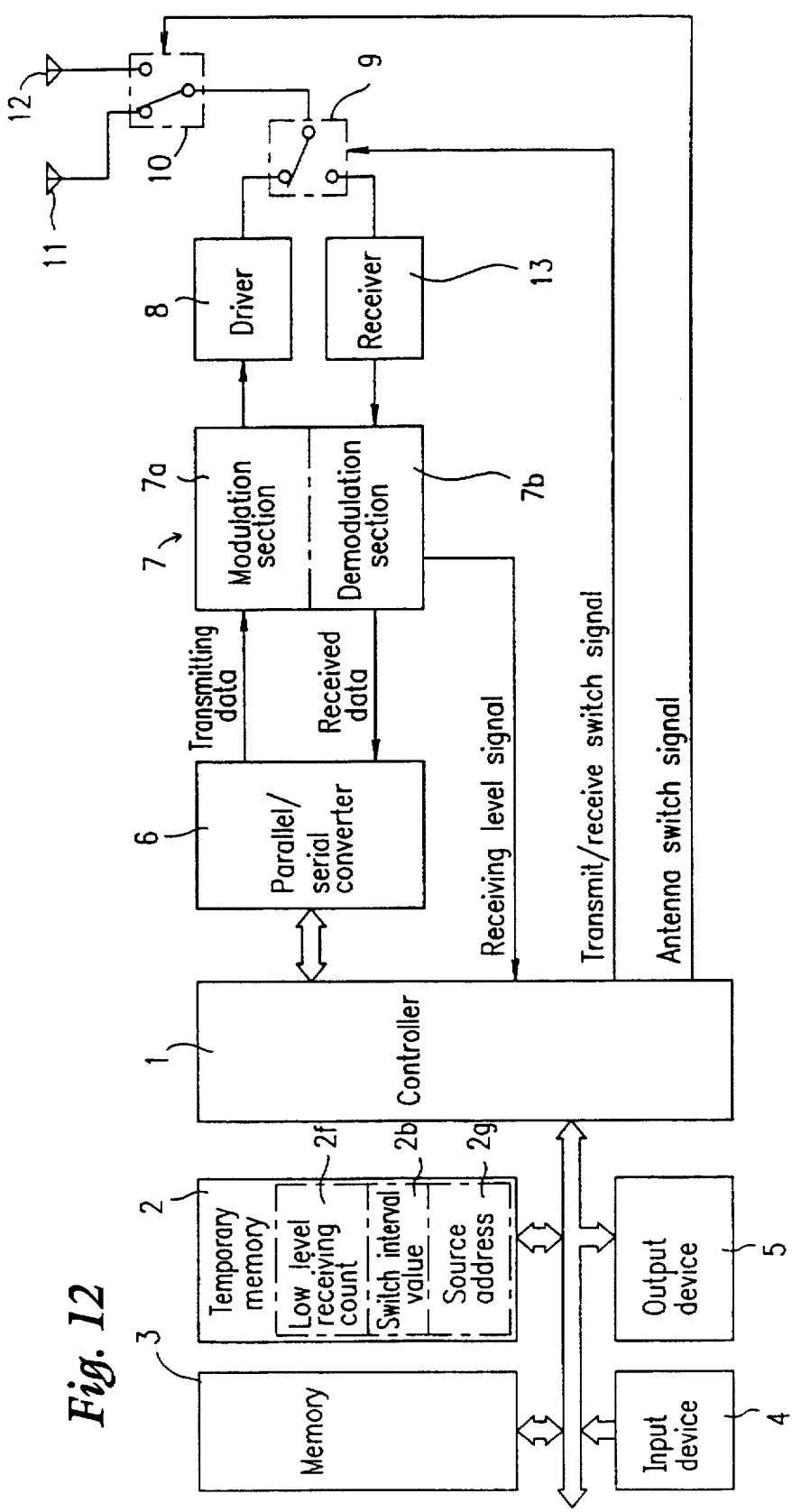
FIG. 12 is a block diagram showing the configuration of a terminal unit on the receiver side of Example 7 according to the present invention.
Figure 13:
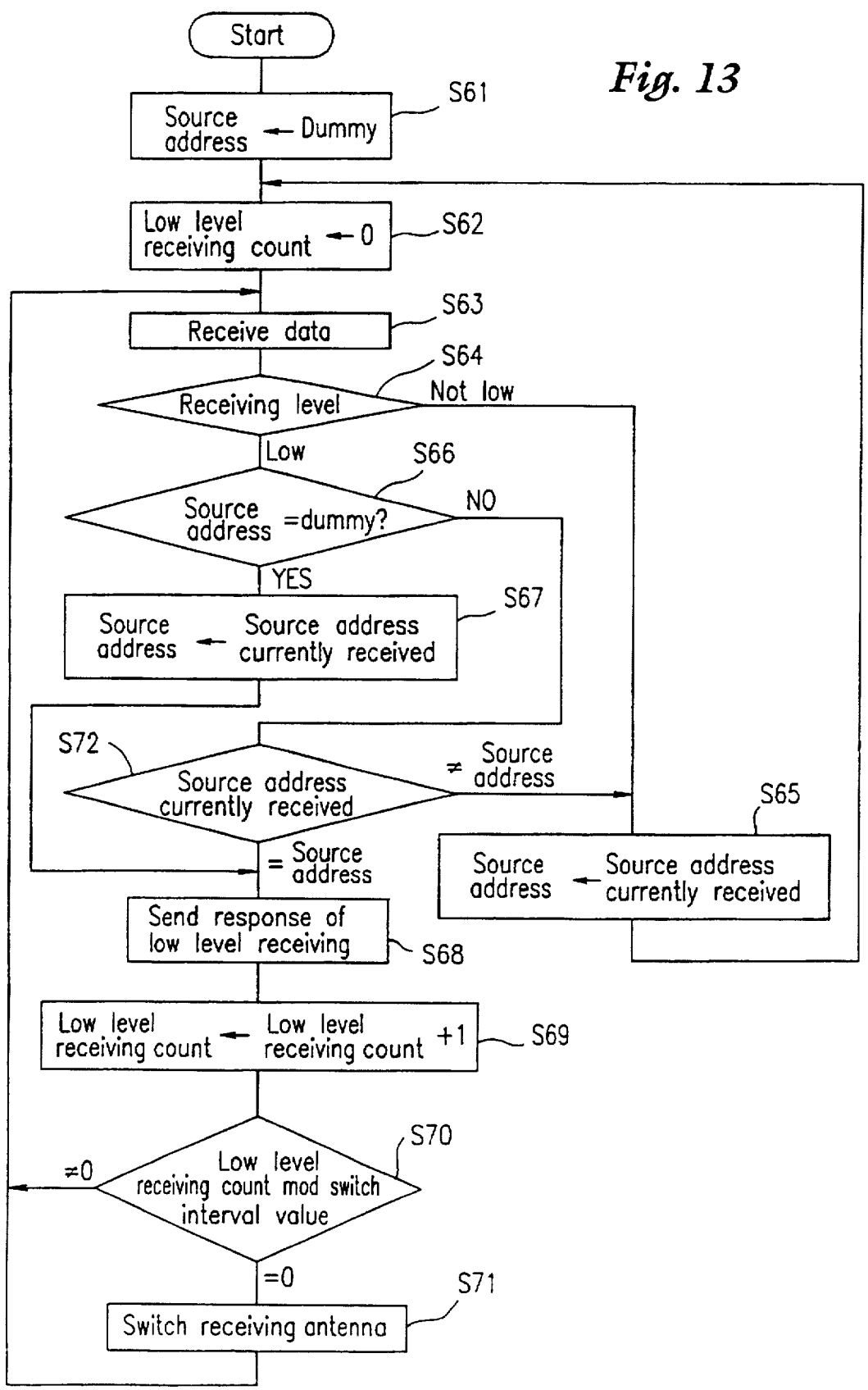
FIG. 13 is a flowchart of a receiving program used on the receiver side in Example 7.
Figure 14:
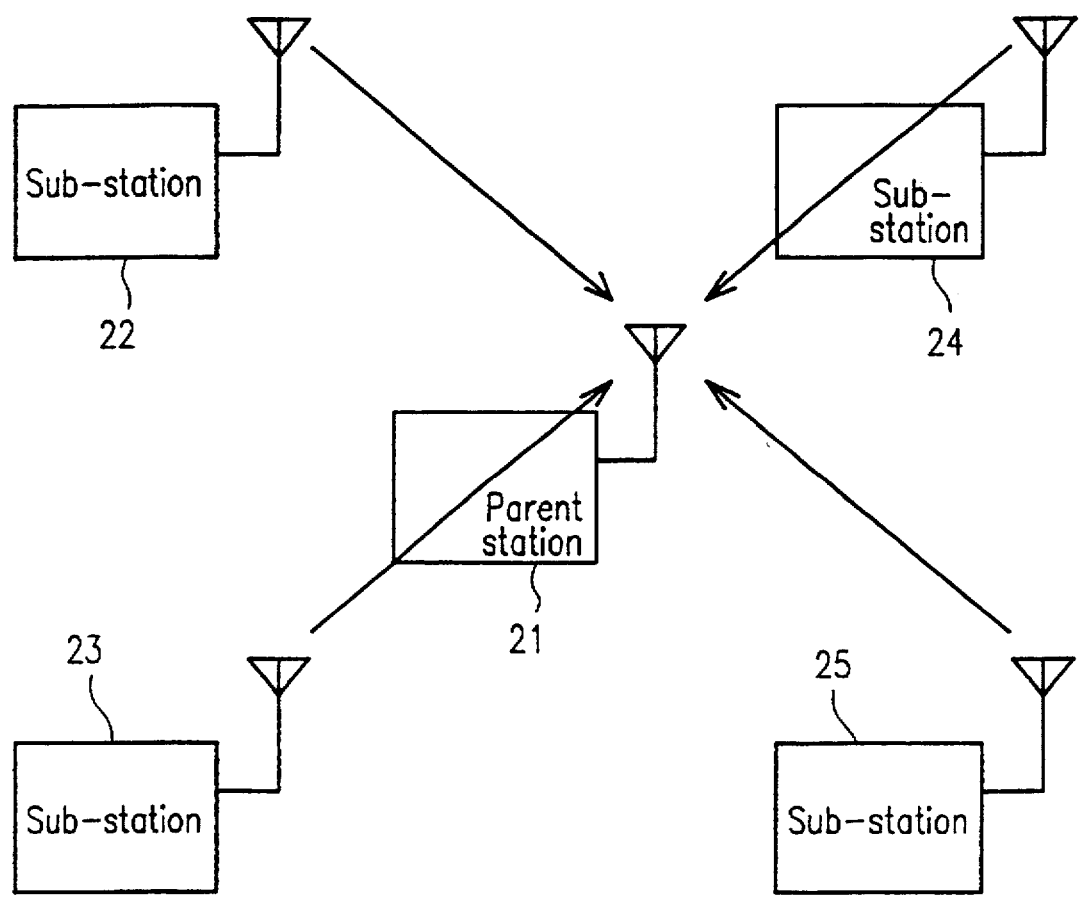
FIG. 14 shows a conventional radio communication system where communication is conducted between one parent station and a plurality of sub-stations.

Referring to FIGS. 12 and 13, the seventh example of the present invention will be described. FIG. 12 is a block diagram showing the configuration of a terminal unit of Example 7. FIG. 13 is a flowchart of a receiving program on the receiver side.

In Example 7, still another example of an antenna switch requiring factor which may occur in the terminal unit of Example 2 will be described. Components having the same functions as those in Examples 1 and 2 shown in FIGS. 1 and 2 are denoted by the same reference numerals, and the description thereof is omitted.

In this example, as in Example 6, the combination of the transmitting and receiving antennas is changed when the receiving level on the receiver side is low. In this example, however, the terminal unit on the receiver side receives data transmitted from a plurality of terminal units on the transmitter side. The hardware configuration of the terminal units on the transmitter side is the same as that in Example 2 shown in FIG. 2. Referring to FIG. 12, the temporary memory 2 of the terminal unit on the receiver side includes the low level receiving count area $2f$ for storing the low level receiving count, the switch interval area $2b$ for storing the switch interval value, and a source address area $2g$ for storing a source address. The setting of the low level receiving count stored in the low level receiving count area $2f$ is the same as that described in Example 6. The result of the detection of the receiving level obtained in the demodulation section $7b$ of the modulator/demodulator 7 is sent to the controller 1 as a receiving level signal. The setting of the switch interval value stored in the switch interval area $2b$ is as described in Example 2. The source address stored in the source address area 2g corresponds to the address detected at the start of data receiving. The source address is an identification code for identifying the terminal unit on the transmitter side. The source address may not be detected when a receiving error occurs in received data. It can be detected, however, as far as data is received though the level thereof may be low.

The procedure of the transmission program in the terminal unit on the transmitter side is the same as that described in Example 6. Referring to FIG. 13, the procedure of the receiving program in the terminal unit on the receiver side will be described. First, a dummy address is stored in the source address area 2g (step S61), and the low level receiving count in the low level receiving count area 2f is initialised to "0" (step S62). Then, data is received (step S63). The data receiving in this example refers to the receiving of all of a series of data including all blocks, if the data is divided into a plurality of blocks, because these blocks have the common source address. Thus, after a series of data ore received, the level of the received data is examined (step S64). If it is determined that the receiving level is not low, the source address is changed to the address of the transmitter of the current received data (step S65). Then, the process returns to step S62 to initialize the low level receiving count and waits for next data transmission (step S63). The low level receiving count is initialized for the some reason as described in Example 6.

If the receiving level is determined to be low in step S64, whether or not the source address is a dummy is examined (step S66). If the low level date is the first received data, the source address is a dummy. Thus, the source address is changed to the address of the transmitter of the current received data as in step S65 (step S67). Then, a response indicating the receipt of low level date is sent to the transmitter (step S68), and simultaneously the low level receiving count is increased by "1" (step S69). Then, the remainder of the low level receiving count divided by the switch interval value is calculated as the antenna switching processing (step S70). If the remainder is "0", the receiving antenna is switched (step S71). If the remainder is not "0", the receiving antenna is not switched. In this example, since the switch interval value on the receiver side is set at "1", the receiving antenna is switched every antenna switch processing. After the completion of the antenna switch processing, the process returns to step S63 to wait for next data transmission.

If the level of date received after the change of the source address in step S67 is determined to be low, the source address for the date will be determined as not dummy in step S66. Accordingly, for all received data which are determined NO in step S65, whether or not the stored source address and the source address of the currently received data are identical to each other is examined, (step S72). If they are identical, i.e., if data received from the same transmitter is determined low again, the response to the transmitter (step S68), the increment of the low level receiving count (step S69), and the antenna switch processing (steps S70 and S71) arc executed as described above. The process then returns to step S63 and waits for next data transmission. Thus, when the level of data received from the same transmitter is determined low consecutively, the combination of the transmitting and receiving antennas is sequentially changed with the antenna switch processing. Accordingly, a combination with which the receiving level is not low can be selected among the four combinations without fail, if such a combination exists.

If data is received from a different transmitter and the level of the data is determined low, the source address of the currently received data is determined to be different from the stored source address in step S72. In this case, the stored source address is replaced with the source address of the currently received data without executing the antenna switch processing (step S65). Then, the process returns to step S62 to initialize the low level receiving count and waits for next data transmission (step S63). Thus, when the transmitter changes, the antenna switch processing is not executed when received data from the new transmitter is determined low first. Instead, the combination of the transmitting and receiving antennas used last time for the previous transmitter is retained. This procedure is advantageous in such a case that data from the new transmitter lasts only once and subsequently data from the previous transmitter follows. Data from the previous transmitter can be received without repeating the antenna switch processing. When data from the new transmitter is received in succession and determined low consecutively, the stored source address end the source address of currently received data are determined identical to each other in step S72. Then, the antenna switch processing is executed to select a combination suitable for the new transmitter.

Thus, according to this example, as far as the transmission/receiving is conducted between the same terminal units, the combination of the transmitting and receiving antennas is sequentially changed with the antenna switch processing every time low level receiving data is detected as in Example 6. Accordingly, if a combination of the transmitting and receiving antennas which can provide a radio wave condition where the receiving level is not low exists among the four combinations, this combination can be selected without fail to effect better data transmission/receiving. When the transmitter is changed, the antenna switch processing is not executed for the first data receiving from the new transmitter even when a low level is detected in the data. Thus, in the case where a different transmitter interrupts once or the transmitter frequently changes one after another, the combination of the transmitting and receiving antennas will not be changed unnecessarily.

In this example, the antenna switch processing was executed every time low level receiving from the same transmitter is detected. Alternatively, it may be executed every time low level receiving from the same transmitter is detected a plurality of times.

In Examples 1 to 7, the two antennas 11 and 12 were switched therebetween. It is also possible to configure to conduct the switching among three or more antennas without substantially changing the configuration described above. In Examples 2 to 7, the switch interval values on the transmitter and receiver sides were set at "2" and "1", respectively. However, they can be set at any appropriate values depending on the number of antennas and other conditions. For example, the switch interval values on the transmitter and receiver sides may be set at "4" and "2", respectively. In such a case, the combination of the transmitting and receiving antennas is changed every other antenna switch processing. Thus, all of the four combinations will be realized after the antenna switch processing has been executed eight times. In Examples 2 to 7, the transmitting and receiving antennas were switched when the remainder of a certain count value divided by the switch interval value is "0". Any value of the remainder can also be used as far as it is less than the switch interval value.

The switch count area 2a, the switch interval area 2b, the re-transmission count area 2c, the re-transmission upper limit area 2d, the receiving error count area 2e, the low level receiving count area 2f, and the source address area 2g in the above examples may be entirely or partially located in the memory 3, instead of the temporary memory 2. The terminal units provided with transmission/receiving circuits were used in the above examples. Instead, a terminal unit provided with either a transmission circuit or a receiving circuit can also be used in combination with another terminal unit. The present invention is also applicable to radio communication apparatuses other than the exemplified terminal units.

Thus, according to the radio communication apparatus of the present invention, a variety of data receiving conditions can be realized by switching antennas on both the transmitter and receiver sides. As a result, the effect of the space diversity can be obtained sufficiently even under a complicate radio wave circumstance or an deteriorated radio wave circumstance.

If the radio communication apparatuses on the transmitter and receiver sides repeat the antenna switch processing independently, all the combinations of the transmitting and receiving antennas can be selected without fail though some combination(s) may appear twice or more before all the combinations appear. If the radio communication apparatuses on the transmitter and receiver sides execute the antenna switch processing in accordance with a predetermined antenna switch procedure programmed to select all the combinations of the transmitting and receiving antennaes, all the combinations can be selected without allowing any combination(s) to appear twice. The antenna switch procedure can be determined only by the calculation between the current value of the switch count and a predetermined value.

Transmitting data can be repeatedly re-transmitted through all the combinations of the transmitting and receiving antennas to ensure the transmission of the data to the receiver side. By detecting a receiving error or low level receiving on the receiver side, a combination of the transmitting and receiving antennas through which data can be received under better conditions can be selected among all the combinations without fail. Even in the case where detection of a receiving error and re-transmission of data are conducted automatically, a combination of the transmitting and receiving antennas through which data can be transmitted without an error can be selected without fail. When the transmitter is frequently changed, the combination of the transmitting and receiving antennas will not be changed unnecessarily.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A pair of radio communication apparatuses on a transmitter side and a receiver side for conducting data transmission and reception through radio communication by a space diversity method where a plurality of antennas are switched there between.

wherein the radio communication apparatus on the transmitter side comprises a transmission circuit for conducting data transmission and a transmitting antenna switch circuit for selecting a transmitting antenna among a plurality of transmitting antennas for transmitting radio waves and connecting the selected transmitting antenna to the transmission circuit;

the radio communication apparatus on the receiver side comprises a reception circuit for conducting data reception and a receiving antenna switch circuit for selecting a receiving antenna among a plurality of receiving antennas on the receiver side the radio waves and connecting the selected receiving antenna to the reception circuit wherein the radio communication apparatus on the transmitter side further comprises transmitting antenna switch means for executing an antenna switch processing by controlling whether or not the transmitting antennas are switched by the transmitting antenna switch circuit and which transmitting antenna is selected in accordance with an antenna switch procedure designed so that, when both the transmitting antenna switch circuit and the receiving antenna switch circuit switch the transmitting antennas and the receiving antennas simultaneously or either one of the transmitting antenna switch circuit and the receiving antenna switch circuit switches the transmitting or receiving antennas and a switch count corresponding to the number of times of switching is equal to a product of the number of transmitting antennas and the number of receiving antennas, all combinations of the transmitting antennas and the receiving antennas realized by all of the switching are different from one another, and the radio communication apparatus on the receiver side further comprises receiving antenna switch means for executing an antenna switch processing by controlling whether or not the receiving antennas are switched by the receiving antenna switch circuit and which receiving antenna is selected in accordance with the antenna switch processing.

2. A pair of radio communication apparatuses according to claim 1, wherein the radio communication apparatus on the transmitter side further comprises re-transmission means for transmitting data repeatedly for a predetermined number of times, and the transmitting antenna switch means executes the antenna switch processing every time the data is transmitted, and the radio communication apparatus on the receiver side further comprises received data synthesizing means for selecting or synthesizing effective received data from a plurality of received data every time data is received a plurality of number of times, and the receiving antenna switch means executes the antenna switch processing every time the data is received.

3. A pair of radio communication apparatuses according to claim 1, wherein the radio communication apparatus on the transmitter side further comprises re-transmission means for re-transmitting previously transmitted data when a response indicating detection of a receiving error is received from the radio communication apparatus on the receiver side or a response indicating success in receiving the data is not received, and the transmitting antenna switch means executes the antenna switch processing when the re-transmission means re-transmits the transmitted data, and the radio communication apparatus on the receiver side further comprises receiving error detection means for detecting a receiving error of received data and response means for sending a response to the radio communication apparatus on the transmitter side through radio communication when the receiving error detection means detects a receiving error or when the data has been successfully received, and the receiving antenna switch means executes the antenna switch processing every time the receiving error detection means detects a receiving error.

4. A pair of radio communication apparatuses according to claim 1, wherein the radio communication apparatus on the receiver side further comprises re-transmission receiving detection means for detecting that received data is re-transmitted data, and the receiving antenna switch means executes the antenna switch processing when the re-transmission receiving detection means detects that the received data is re-transmitted data, and the radio communication apparatus on the transmitter side further comprises re-transmission detection means for detecting that transmitted data has been successfully received by re-transmission, and the transmitting antenna switch means executes the antenna switch processing when the re-transmission detection means detects success in transmitting data by re-transmission.

5. A pair of radio communication apparatuses according to claim 1, wherein the radio communication apparatus on the receiver side further comprises receiving level detection means for detecting a receiving level of received data and response means for sending a response to the radio communication apparatus on the transmitter side through radio communication when the receiving level detection means detects a low receiving level, and the receiving antenna switch means executes the antenna switch processing when the receiving level detection means detects a low receiving level, and the transmitting antenna switch means of the radio communication apparatus on the transmitter side executes the antenna switch processing when a response indicating detection of a low receiving level from the radio communication apparatus on the receiver side is received.

6. A pair of radio communication apparatuses according to claim 5, wherein the radio communication apparatus on the receiver side further comprises source address memory means for storing an address of a transmitter of previously received data and antenna switch withholding means for instructing the receiving antenna switch means to withhold the execution of the antenna switch processing and instructing the response means to withhold the sending of the response to the transmitter side when an address of a transmitter of currently received data is different from the source address stored in the source address memory means.

7. A pair of radio communication apparatuses on a transmitter side and a receiver side for conducting data transmission and reception through radio communication by a space diversity method where a plurality of antennas are switched there between, wherein the radio communication apparatus on the transmitter side comprises a transmission circuit for conducting data transmission and a transmitting antenna switch circuit for selecting a transmitting antenna among a plurality of transmitting antennas for transmitting radio waves and connecting the selected transmitting antenna to the transmission circuit;

the radio communication apparatus on the receiver side comprises a reception circuit for conducting data reception and a receiving antenna switch circuit for selecting a receiving antenna among a plurality of receiving antennas on the receiver side the radio waves and connecting the selected receiving antenna to the reception circuit wherein each of the radio communication apparatuses on the transmitter side and the receiver side further comprises switch count means for counting the number of times of switching conducted by both the transmitting antenna switch circuit and the receiving antenna switch circuit simultaneously or by one of the antenna switch circuits, the radio communication apparatus on the transmitter side further comprises transmitting antenna switch means for executing an antenna switch processing by allowing the transmitting antenna switch circuit to switch the transmitting antennas in a predetermined order only when a remainder of the switch count counted by the switch count means on the transmitter side divided by a transmission switch interval value that is equal to a predetermined value, and the radio communication apparatus on the receiver side further comprises receiving antenna switch means for executing an antenna switch processing by allowing the receiving antenna switch circuit to switch the receiving antennas in a predetermined order only when a remainder of the switch count counted by the switch count means on the receiver side divided by a receiving switch interval value that is equal to a predetermined value.

8. A pair of radio communication apparatuses according to claim 7, wherein the radio communication apparatus on the transmitter side further comprises re-transmission means for transmitting data repeatedly for a predetermined number of times, and the transmitting antenna switch means executes the antenna switch processing every time the data is transmitted, and the radio communication apparatus on the receiver side further comprises received data synthesizing means for selecting or synthesizing effective received data from a plurality of received data every time data is received a plurality of number of times, and the receiving antenna switch means executes the antenna switch processing every time the data is received.

9. A pair of radio communication apparatuses according to claim 7, wherein the radio communication apparatus on the transmitter side further comprises re-transmission means for re-transmitting previously transmitted data when a response indicating detection of a receiving error is received from the radio communication apparatus on the receiver side or a response indicating success in receiving the data is not received, and the transmitting antenna switch means executes the antenna switch processing when the re-transmission means re-transmits the transmitted data, and the radio communication apparatus on the receiver side further comprises receiving error detection means for detecting a receiving error of received data and response means for sending a response to the radio communication apparatus on the transmitter side through radio communication when the receiving error detection means detects a receiving error or when the data has been successfully received, and the receiving antenna switch means executes the antenna switch processing every time the receiving error detection means detects a receiving error.

10. A pair of radio communication apparatuses according to claim 7, wherein the radio communication apparatus on the receiver side further comprises re-transmission receiving detection means for detecting that received data is re-transmitted data, and the receiving antenna switch means executes the antenna switch processing when the re-transmission receiving detection means detects that the received data is re-transmitted data, and the radio communication apparatus on the transmitter side further comprises re-transmission detection means for detecting that transmitted data has been successfully received by re-transmission, and the transmitting antenna switch means executes the antenna switch processing when the re-transmission detection means detects success in transmitting data by re-transmission.

11. A pair of radio communication apparatuses according to claim 7, wherein the radio communication apparatus on the receiver side further comprises receiving level detection means for detecting a receiving level of received data and response means for sending a response to the radio communication apparatus on the transmitter side through radio communication when the receiving level detection means detects a low receiving level, and the receiving antenna switch means executes the antenna switch processing when the receiving level detection means detects a low receiving level, and the transmitting antenna switch means of the radio communication apparatus on the transmitter side executes the antenna switch processing when a response indicating detection of a low receiving level from the radio communication apparatus on the receiver side is received.

12. A pair of radio communication apparatuses according to claim 11, wherein the radio communication apparatus on the receiver side further comprises source address memory means for storing an address of a transmitter of previously received data and antenna switch withholding means for instructing the receiving antenna switch means to withhold the execution of the antenna switch processing and instructing the response means to withhold the sending of the response to the transmitter side when an address of a transmitter of currently received data is different from the source address stored in the source address memory means.

* * * * *